US012131345B2

(12) United States Patent
Swinson et al.

(10) Patent No.: US 12,131,345 B2
(45) Date of Patent: *Oct. 29, 2024

(54) SYSTEM AND METHOD FOR DEALER EVALUATION AND DEALER NETWORK OPTIMIZATION USING SPATIAL AND GEOGRAPHIC ANALYSIS IN A NETWORK OF DISTRIBUTED COMPUTER SYSTEMS

(71) Applicant: TrueCar, Inc., Santa Monica, CA (US)

(72) Inventors: Michael D. Swinson, Santa Monica, CA (US); Christopher James O'Keeffe, Oak Park, CA (US); Daniel Salazar, Torrance, CA (US); Ludovica Rizzo, Los Angeles, CA (US)

(73) Assignee: TrueCar, Inc., Santa Monica, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/165,584

(22) Filed: Feb. 2, 2021

(65) Prior Publication Data
US 2021/0158382 A1    May 27, 2021

Related U.S. Application Data

(63) Continuation of application No. 15/855,542, filed on Dec. 27, 2017, now Pat. No. 10,963,897.

(60) Provisional application No. 62/440,222, filed on Dec. 29, 2016.

(51) Int. Cl.
| G06Q 30/02 | (2023.01) |
| G06F 16/951 | (2019.01) |
| G06Q 30/0201 | (2023.01) |
| G06Q 30/0204 | (2023.01) |

(52) U.S. Cl.
CPC ....... *G06Q 30/0205* (2013.01); *G06F 16/951* (2019.01); *G06Q 30/0201* (2013.01)

(58) Field of Classification Search
None
See application file for complete search history.

(56) References Cited

U.S. PATENT DOCUMENTS

| 6,470,324 B1 | 10/2002 | Brown et al. |
| 7,421,322 B1 | 9/2008 | Silversmith et al. |
| 7,865,409 B1 | 1/2011 | Monaghan |
| 8,612,314 B2 | 12/2013 | Swinson et al. |

(Continued)

FOREIGN PATENT DOCUMENTS

WO    WO2010030632    3/2010

OTHER PUBLICATIONS

Notice of Allowance issued for U.S. Appl. No. 16/818,585, dated Oct. 18, 2021, 7 pages.

(Continued)

*Primary Examiner* — Alan Torrico-Lopez
(74) *Attorney, Agent, or Firm* — Sprinkle IP Law Group

(57) ABSTRACT

Embodiments of vehicle data systems for use in distributed computer network are disclosed. Particular embodiments may determine and enhance vehicle data from various data sources distributed across the computer network, and utilize the enhanced vehicle data in the determination of normalization metrics that account for geography and population density or spatial behavioral patterns. Embodiments may utilize these normalization metrics to determine or predict one or more metrics about participants in a network.

18 Claims, 15 Drawing Sheets

(56) References Cited

U.S. PATENT DOCUMENTS

| | | |
|---|---|---|
| 8,620,763 B2 | 12/2013 | Sullivan et al. |
| 8,645,193 B2 | 2/2014 | Swinson et al. |
| 8,661,020 B2 | 2/2014 | Sullivan et al. |
| 8,661,403 B2 | 2/2014 | Sullivan et al. |
| 8,868,480 B2 | 10/2014 | McBride et al. |
| 9,009,093 B1 | 4/2015 | Omoigui |
| 9,984,401 B2 | 5/2018 | Taira et al. |
| 10,546,337 B2 | 1/2020 | Chrzan |
| 10,963,897 B2 | 3/2021 | Swinson et al. |
| 11,205,187 B2 | 12/2021 | Swinson et al. |
| 12,079,830 B2 | 9/2024 | Swinson et al. |
| 2003/0120564 A1 | 6/2003 | Jarrett et al. |
| 2004/0158481 A1 | 8/2004 | Gennaro et al. |
| 2007/0129989 A1 | 6/2007 | Ponton et al. |
| 2007/0205276 A1 | 9/2007 | Sodan et al. |
| 2010/0070343 A1 | 3/2010 | Taira et al. |
| 2010/0174657 A1 | 7/2010 | Stanton |
| 2013/0006876 A1 | 1/2013 | Swinson et al. |
| 2013/0006916 A1 | 1/2013 | McBride et al. |
| 2013/0091452 A1 | 4/2013 | Sorden et al. |
| 2013/0173330 A1* | 7/2013 | Puskorius ........ G06Q 10/06315 705/7.25 |
| 2014/0019214 A1 | 1/2014 | Beaver |
| 2014/0074553 A1 | 3/2014 | Sullivan |
| 2014/0180882 A1 | 6/2014 | Berger et al. |
| 2014/0214491 A1 | 7/2014 | Semeniuk et al. |
| 2014/0214696 A1 | 7/2014 | Laughlin et al. |
| 2014/0244424 A1 | 8/2014 | Swinson et al. |
| 2015/0310466 A1* | 10/2015 | LaCivita .............. G06Q 10/087 705/7.34 |
| 2015/0379537 A1 | 12/2015 | Ghosh |
| 2016/0225003 A1 | 8/2016 | Inman et al. |
| 2016/0225062 A1* | 8/2016 | Inman ................ G06Q 30/0631 |
| 2016/0253682 A1 | 9/2016 | Inman et al. |
| 2017/0032400 A1 | 2/2017 | Gilmore et al. |
| 2017/0032456 A1 | 2/2017 | Strauss et al. |
| 2018/0082316 A1 | 3/2018 | Swinson et al. |
| 2020/0219118 A1 | 7/2020 | Swinson et al. |
| 2022/0058673 A1 | 2/2022 | Swinson et al. |

OTHER PUBLICATIONS

Office Action issued for U.S. Appl. No. 17/520,191, dated Jul. 27, 2022, 50 pages.

Office Action issued for U.S. Appl. No. 17/520,191, dated Jan. 13, 2023, 22 pages.

Office Action issued for U.S. Appl. No. 17/520,191, dated May 5, 2023, 25 pages.

Office Action issued for U.S. Appl. No. 17/165,584, dated Oct. 12, 2023, 7 pages.

Fulda, Carl, "The Automobile Franchise Act of 1956: A Dissent," The Antitrust Bulletin, 1956, pp. 367-374.

Office Action issued for U.S. Appl. No. 15/855,542, dated Jul. 22, 2020, 10 pages.

Notice of Allowance issued for U.S. Appl. No. 15/855,542, dated Nov. 27, 2020, 7 pages.

Notice of Allowance issued for U.S. Appl. No. 17/520,191, mailed Apr. 18, 2024, 20 pages.

* cited by examiner

BREAK DOWN BY COMPETITION ZONE

| NAME | UNIQUE ID | ACTIVE DEALER | DEALER STATE | BILLING MODEL | TC DEALER ID | MAX RADIUS |
|---|---|---|---|---|---|---|
| MARK'S HONDA | HONDA-1234 | INACTIVE | MI | SUBSCRIPTION | 1234 | 150 |

BREAK DOWN BY COMPETITION ZONE

| COMPETITION ZONE | LEADS | SALES | NUMBER OF ZIP CODES | MONTHLY INDUSTRY SALES |
|---|---|---|---|---|
| BACKYARD | 15 | 2.9 | 45 | 33 |
| COMPETITION | 15 | 1 | 100 | 4 |
| CONQUEST | 85 | 2.2 | 812 | 7 |
| GRAND TOTAL | 115 | 6.1 | 957 | 44 |

FIG. 12

SYSTEM AND METHOD FOR DEALER EVALUATION AND DEALER NETWORK OPTIMIZATION USING SPATIAL AND GEOGRAPHIC ANALYSIS IN A NETWORK OF DISTRIBUTED COMPUTER SYSTEMS

RELATED APPLICATIONS

This application is a continuation of, and claims a benefit of priority under 35 U.S.C. 120 from, U.S. patent application Ser. No. 15/855,542, filed Dec. 27, 2017, issued as U.S. Pat. No. 10,963,897, entitled "System and Method for Dealer Evaluation and Dealer Network Optimization Using Spatial and Geographic Analysis in a Network of Distributed Computer Systems," which claims a benefit of priority under 35 U.S.C. § 119 to U.S. Provisional Application No. 62/440,222, entitled "System and Method for Dealer Evaluation and Dealer Network Optimization Using Spatial and Geographic Analysis in a Network of Distributed Computer Systems," by Swinson et al, filed Dec. 29, 2016, which are hereby fully incorporated by reference herein for all purposes.

COPYRIGHT NOTICE

A portion of the disclosure of this patent document contains material that is subject to copyright protection. The copyright owner has no objection to facsimile reproduction of the patent document or the patent disclosure as it appears in the Patent and Trademark Office patent file or records, but otherwise reserves all copyright rights thereto.

TECHNICAL FIELD

The present disclosure relates generally to distributed and networked computer systems. More particularly, the present disclosure relates to the use of distributed and networked computer systems in the collection and enhancement of data in a distributed network environment and the use of the enhanced data for the determination and use of geography based metrics. Even more specifically, the present disclosure to improving the use of distributed and networked computer systems for the collection and enhancement of data used in the determination and utilization of geography based metrics which may be usefully applied in a variety of contexts, including in the context of vehicle sales and analysis of vehicle dealers and vehicle dealer networks.

BACKGROUND

In many instances, consumers do not have information relevant to a specifically desired product or do not understand such information. Exacerbating this problem is the fact that complex, negotiated transactions can be difficult for consumers to understand due to a variety of factors, including interdependence between local demand and availability of products or product features, the point-in-time in the product lifecycle at which a transaction occurs, and the interrelationships of various transactions to one another.

Sellers may experience similar difficulties but from an opposite perspective. It is often time difficult to determine or predict the behavior of buyers. This difficulty in no small part stems from the fact that behavioral patterns of buyers vary widely with geography. These circumstances can be seen in a variety of contexts. In particular, the automotive transaction process may entail complexity of this type, as the distribution of dealers and consumers can vary widely based on geography.

However, these circumstances have not tempered the desire for effective analysis of the vehicle marketplace. Historically, the vehicle market was analyzed defining distance brackets (e.g., 15, 30 and 60 miles radii) and all performance indicators for data analysis in the vehicle marketplace were calculated for those distance brackets (e.g. close rate in 15 miles; conversion rates in 60 miles around a zip code) for the whole nation, with no regard to the relevance of such distances to the local market. This methodology rendered rather poor predictions.

These poor predictions are not surprising at least because, as discussed, behavioral patterns vary across the nation due to population and car dealer densities, as well as connectivity (e.g., number and types of roads or other transport mechanisms). As a consequence, a journey of 30 miles (e.g., to a vehicle dealer) or more in rural areas is rather common, whereas such a distance is far beyond the typical journey of an urban customer. Even if urban customers are considered, however, the typical distance driven varies by neighborhood and car brand (make). For example, the distance travelled for a consumer to find an Alfa Romeo dealership may typically be much farther than the distance travelled to find a Ford dealership, even for urban consumers. Thus, behavioral patterns vary across the nation due to population and car dealer densities as well as connectivity.

As market key indicators (e.g., demand, conversion and close rates, market share, etc.) are currently determined based on distance of dealers or consumers, all predictions are subject to substantial noise coming from the variability described above, hence the prediction accuracy of such indicators or other values are rather low. As one example, when it is desired to predict close rate based on distance, samples from rural places will have highly different close rates than samples from urban environments for the exact same distance. This is detrimental to prediction accuracy since it introduces noise.

On the other hand, if it is decided to segment by region type, prohibitively small samples for some makes may result. The current methods for the determination of market indicators in the vehicle sales context thus adversely affects the abilities of participants in the industry to provide accurate analysis of the marketplace. This situation is particularly germane to those participants that may maintain networks of dealerships or provide dealer or consumer facing products that rely on the accuracy of those marketplace analytics, such as TrueCar, Inc.

There are therefore a number of unmet desires when it comes to obtaining, analyzing and presenting vehicle pricing data. In particular, it is desired to provide metrics that account for density of population and density of dealerships for various makes in the context of the vehicle marketplace. Specifically, what is desired are computerized systems and methods for determining such metrics that can obtain, manage and process large amounts of data available across a wide variety of distributed computer systems and efficiently process obtained data to establish high-fidelity metrics that are accurately reflective of real-world conditions and that may be used to distribute market indicators or other data across a network in real-time.

SUMMARY

To that end, among others, attention is thus directed to the systems presented here, which provide for the determination and use of one or more normalization metrics that account for geography and population density or spatial behavioral patterns of consumers. In particular, embodiments may obtain data from a variety of data sources across a distributed network and enhance data records by correlating the data obtained from these distributed sources. This data can then be used to determine these normalization metrics. Such normalization metrics may be one or more quantifiers of the effect of spatial distribution of consumers or dealers.

These metrics may provide a normalized way of comparing and understanding spatial behavioral patterns of car buyers and their links to competitiveness of car dealers. These metrics may be utilized in the computation of one or more performance metrics such as close rate or the like to account for these spatial differences when performing the determination of these performance metrics. Moreover, the normalization metrics may be utilized to assign a geographic area to a particular zone for a dealer (e.g., relative to one or more other dealers).

The normalization metrics determined for a particular dealer or set of dealers (e.g., in a specified marketplace) may be used to determine other metrics related to a dealer or a network of dealers. For example, these normalization metrics may be utilized to determine expected sales for a dealer or the expected sales for a dealer broken out, for example, across geographic zones or regions of competitiveness.

As another example, the normalization metrics determined for a particular dealer or set of dealers (e.g., in a specified marketplace) may be used to quantify the number of sales originated by or attributable to the dealer, or to quantify and predict, for a given dealer, the effects on sales associated with a network of dealerships attributable to the addition or subtraction of one or more particular dealers to or from the dealer network.

These metrics or geographic areas associated with the dealer can be presented to a user in a visual display in real-time, or may be used to determine, in real-time data to be presented to the user in a visual display. For example, a graphical display in an interface presented to a user may present a set of coded zip codes in the vicinity of the dealer. Such a presentation may include, for example, a depiction of a zip code map and a color coded presentation of certain metrics. These interfaces may, for example, graphically depict a metric using a set of color coded (or otherwise identified) zip codes that graphically depict a metric (such as the effect of the addition or subtraction of a dealer from a network of dealers).

Embodiments thus provide a variety of technological advantages, including the collection, correlation and enhancement of data from a variety of distributed sources. Moreover, embodiments may enable the efficient and speedy determination of normalization metrics that may be utilized in real-time to present individualized dealer data related to geography.

In particular, it has heretofore been virtually impossible to provide, in real-time over a distributed computer network, interfaces and data specific to a particular dealer or dealer network where those interfaces quantify and classify geographic areas specifically for an individual dealer or dealer network. As a result of the architecture and methods utilized by embodiments of vehicle data systems as presented herein, an interface may be provided, in real-time, over a distributed computer network to a number of dealers where the interface may be tailored to present metrics related to the classification and qualification of geographic regions specific to that dealer through the interface.

These, and other, aspects of the invention will be better appreciated and understood when considered in conjunction with the following description and the accompanying drawings. The following description, while indicating various embodiments of the invention and numerous specific details thereof, is given by way of illustration and not of limitation. Many substitutions, modifications, additions or rearrangements may be made within the scope of the invention, and the invention includes all such substitutions, modifications, additions or rearrangements.

BRIEF DESCRIPTION OF THE DRAWINGS

The drawings accompanying and forming part of this specification are included to depict certain aspects of the invention. A clearer impression of the invention, and of the components and operation of systems provided with the invention, will become more readily apparent by referring to the exemplary, and therefore nonlimiting, embodiments illustrated in the drawings, wherein identical reference numerals designate the same components. Note that the features illustrated in the drawings are not necessarily drawn to scale.

FIG. 12 is a depiction of one embodiment of an interface used by a vehicle data system for presenting the result of the application of a SALT model for a dealer.

DETAILED DESCRIPTION

Figure 1:
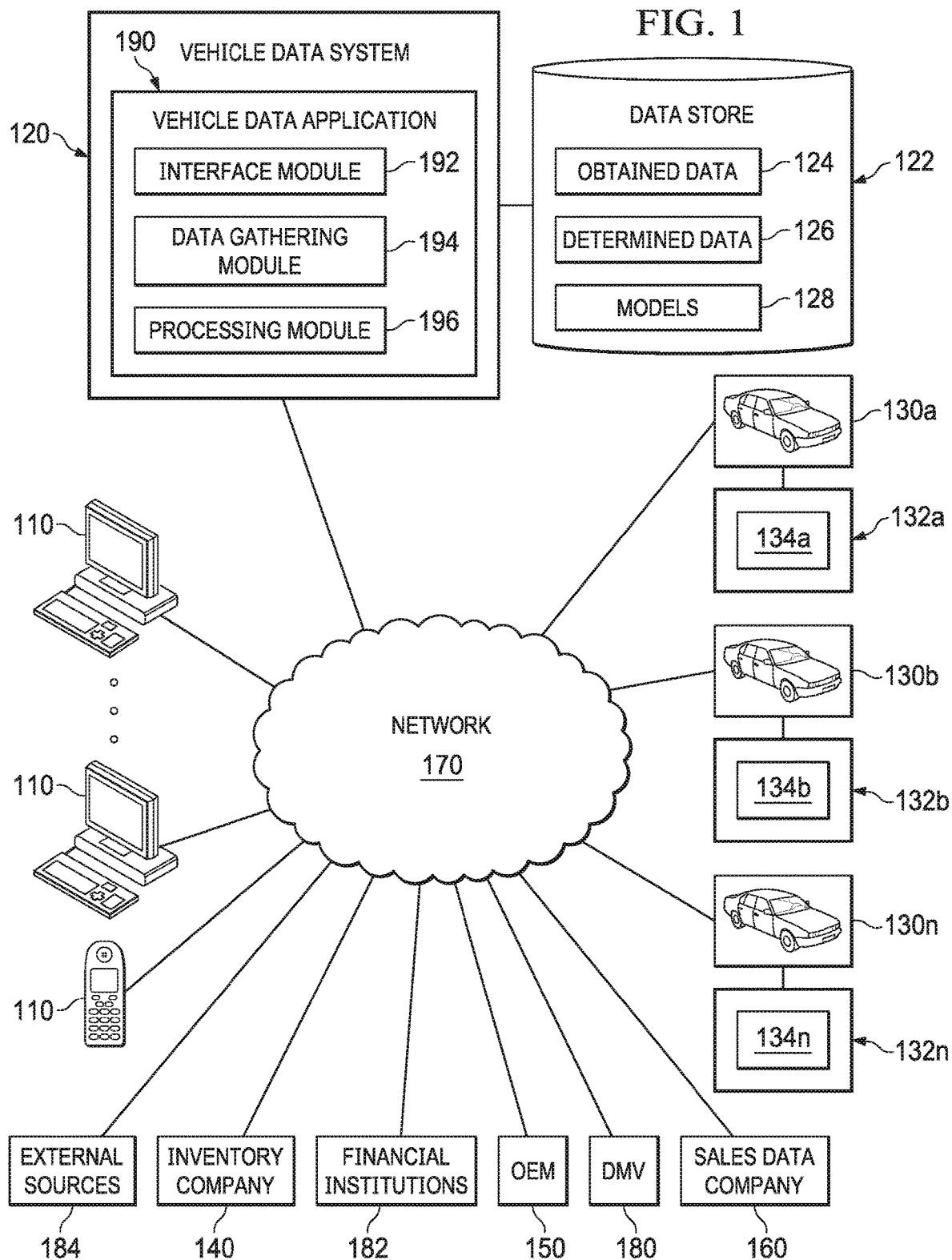
FIG. 1 is a block diagram of one embodiment of a topology of a distributed computer network, including a vehicle data system.

The invention and the various features and advantageous details thereof are explained more fully with reference to the nonlimiting embodiments that are illustrated in the accompanying drawings and detailed in the following description. Descriptions of well-known starting materials, processing techniques, components and equipment are omitted so as not to unnecessarily obscure the invention in detail. It should be understood, however, that the detailed description and the specific examples, while indicating preferred embodiments of the invention, are given by way of illustration only and not by way of limitation. Various substitutions, modifications, additions and/or rearrangements within the spirit and/or scope of the underlying inventive concept will become apparent to those skilled in the art from this disclosure. Embodiments discussed herein can be implemented in suitable computer-executable instructions that may reside on a computer readable medium (e.g., a HD), hardware circuitry or the like, or any combination.

As discussed above, there are therefore a number of unmet desires when it comes to obtaining, analyzing and presenting vehicle pricing data or vehicle dealer data. In particular, it is desired to provide and utilize metrics that account for density of population and density of dealerships for various makes in the context of the vehicle marketplace in order to effectively utilize and present such data.

Some background may be useful before describing embodiments in more detail. It may be appreciated that in the context of vehicle data systems, purchasers of vehicles may be thought of as proceeding through a sales funnel provided by the vehicle data system that begins with an initial visit to a point of presence of a vehicle dealer network, such as the Truecar.com website, to search for vehicles of a particular make for sale nearby.

Where the visitor searches for a vehicle and proceeds to contact a dealer, a "conversion" may be said to have occurred and the visitor may be said to have sent the dealer a "lead". A fraction of search visitors send leads, the rest "drop out" (i.e., do not proceed any further down the sales funnel.) The fraction of search visitors that send leads may sometimes be referred to as the "conversion rate," where the "conversion rate" may be expressed more formally as shown below:

$$\text{Conversion Rate} = \frac{\text{leads}}{\text{search visitors}}$$

After submitting a lead, a search visitor may then purchase a car from a dealership. Skilled artisans will further appreciate that only a fraction of leads end with a sale, and that this fraction may be referred to as a "close rate."

$$\text{Close Rate} = \frac{\text{sales}}{\text{leads}}$$

Analyzing the effects, at the network level, of addition or subtraction of one or more dealerships to the close rate of a network of dealerships in a given spatial geographic area presents a further challenge in the context of marketplace analytics. While the addition of a dealership may increase the number of sales to the network, there may also be secondary effects to be considered, such as the extent to which the newly added dealership may draw sales away from existing dealerships in the network.

Predicting the number of sales a dealership would be expected to make in a given geographic area presents another analytical challenge. At present, current systems for defining the extent of the relevant marketplace and areas of competition may not adequately reflect the population density, density of dealerships and other defining characteristics of the marketplace. Accordingly, current systems may be inadequate for recognizing subtler cases of under-performance in a marketplace. For example, a high-volume dealership in a busy vehicular marketplace may, in fact, despite its sales volume, be underperforming. Similarly, a dealership in a thinner vehicular market with modest sales volumes may, in fact, be overperforming in its particular marketplace.

There are therefore a number of unmet desires when it comes to obtaining, analyzing, correlating, enhancing and presenting vehicle pricing data. In particular, it is desired to provide and utilize metrics that account for density of population and density of dealerships for various makes in the context of the vehicle marketplace in order to effectively utilize and present such data.

In particular, it is desired to provide metrics that account for density of population and density of dealerships for various makes in the context of the vehicle marketplace. Further, it is desired to provide, for a particular dealership in a specified marketplace metrics of the expected sales for the dealership. It is likewise desired to provide metrics of the expected sales for the dealership broken out, for example, across geographic zones.

Still further, it is desired to provide, for a particular network of dealerships metrics quantifying the number of sales originated by, or attributable to the dealership or metrics related to effects on sales attributed to a dealer or network of dealers, arising from the addition or subtraction of one or more dealers to or from the network.

Attention is thus directed to the systems presented here, which provide for the determination of one or more normalization metrics that account for geography and population density or spatial behavioral patterns of consumers. These normalization metrics may be a quantifier of the effect of spatial distribution of consumers or dealers holding other factors equal. These metrics may provide a normalized way of comparing and understanding spatial behavioral patterns of car buyers and its links to competitiveness of car dealers.

These metrics may be utilized in the computation of one or more performance metrics such as close rate or the like to account for these spatial differences when performing the determination of these performance metrics. Moreover, the normalization metrics may be utilized to assign a dealer to a particular zone (e.g., relative to one or more other dealers).

Further, the systems presented herein may apply these metrics to the computation of other output variables of interest, such as the expected sales by a dealership in one or more zones of the relevant marketplace. For example, these metrics may be used to subdivide the relevant marketplace into zones of competitiveness, based on, amongst other factors, the proximity of dealers competing for sales of the same make of vehicle. Thus, these metrics may be used to quantify whether, for example, a dealership is performing as expected in the area in which it is the closest dealership, or, for example, whether the dealership is able to take sales from more remote and/or competitive zones.

Still further, these metrics may be utilized in the computation of sales attributable to a network of dealerships. In this way, the systems and methods presented herein may be operable to optimize the membership of the dealership by computing the sales attributable to the network of dealerships in response to addition or subtraction of a dealership. In this way, networks of dealerships, such as the TrueCar network, may be able to quantifiably identify candidate dealerships to be added or removed from the TrueCar network.

Attention is thus directed to embodiment of the systems presented here, which provide, amongst other things, for the determination of one or more normalization metrics that account for geography and population density or spatial behavioral patterns of consumers. These normalization metrics may be a quantifier of the effect of spatial distribution of consumers or dealers holding other factors equal. These normalization metrics may be one or more quantifiers of the effect of spatial distribution of consumers or dealers holding other factors equal. These metrics may provide a normalized way of comparing and understanding spatial behavioral patterns of car buyers and its links to competitiveness of car dealers.

These metrics may be utilized in the computation of one or more performance metrics such as close rate or the like to account for these spatial differences when performing the determination of these performance metrics. Moreover, the normalization metrics may be utilized to assign a dealer or geographic area to a particular zone or zone type (e.g., relative to one or more other dealers).

Embodiments of the systems and methods of the present invention may be better explained with reference to FIG. 1 which depicts one embodiment of a topology which may be used to implement embodiments of the systems and methods of the present invention. Additional example topologies can be found in U.S. Pat. No. 9,129,325, issued Sep. 8, 2015, entitled "SYSTEM AND METHOD FOR AGGREGATION, ANALYSIS, PRESENTATION AND MONETIZATION OF PRICING DATA FOR VEHICLES AND OTHER COMMODITIES,", U.S. Pat. No. 7,945,483, issued May 17, 2011, entitled "SYSTEM AND METHOD FOR SALES GENERATION IN CONJUNCTION WITH A VEHICLE DATA SYSTEM," and U.S. patent application Ser. No. 15/471,805, filed Mar. 28, 2017, entitled "VEHICLE DATA SYSTEM FOR RULES BASED DETERMINATION AND REAL-TIME DISTRIBUTION OF ENHANCED VEHICLE DATA IN AN ONLINE NETWORKED ENVIRONMENT", each of which is hereby incorporated by reference in its entirety for all purposes.

Topology 100 comprises a set of entities including vehicle data system 120 (also referred to herein as the TrueCar system) which is coupled through network 170 to computing devices 110 (e.g. computer systems, personal data assistants, kiosks, dedicated terminals, mobile telephones, smart phones, etc.), and one or more computing devices at inventory companies 140, original equipment manufacturers (OEM) 150, sales data companies 160, financial institutions 182, external information sources 184, departments of motor vehicles (DMV) 180 and one or more associated point of sale locations, in this embodiment, computer systems 132 in car dealers 130. Network 170 may be for example, a wireless or wireline communication network such as the Internet or wide area network (WAN), publicly switched telephone network (PTSN) or any other type of electronic or non-electronic communication link such as mail, courier services or the like.

Vehicle data system 120 may comprise one or more computer systems with central processing units executing instructions embodied on one or more computer readable media where the instructions are configured to perform at least some of the functionality associated with embodiments of the present invention. These applications may include a vehicle data application 190 comprising one or more applications (instructions embodied on a computer readable media) configured to implement an interface module 192, data gathering module 194 and processing module 196 utilized by the vehicle data system 120. Furthermore, vehicle data system 120 may include data store 122 operable to store obtained data 124, data 126 determined during operation, models 128 which may comprise a set of dealer cost model or price ratio models, or any other type of data associated with embodiments of the present invention or determined during the implementation of those embodiments. Data store 122 may include a variety of user data, including user behavioral data, vehicle data, dealer data, manufacturer data and other data.

Vehicle data system 120 may provide a wide degree of functionality including utilizing one or more interfaces 192 configured to for example, receive and respond to queries from users at computing devices 110 or dealer computer 132; interface with inventory companies 140, manufacturers 150, sales data companies 160, financial institutions 170, DMVs 180 or dealers 130 to obtain data; or provide data obtained, or determined, by vehicle data system 120 to any of inventory companies 140, manufacturers 150, sales data companies 160, financial institutions 182, DMVs 180, external data sources 184 or dealers 130. It will be understood that the particular interface 192 utilized in a given context may depend on the functionality being implemented by vehicle data system 120, the type of network 170 utilized to communicate with any particular entity, the type of data to be obtained or presented, the time interval at which data is obtained from the entities, the types of systems utilized at the various entities, etc. Thus, these interfaces may include, for example web pages, web services, a data entry or database application to which data can be entered or otherwise accessed by an operator, or almost any other type of interface which it is desired to utilize in a particular context.

In general, then, using these interfaces 192 vehicle data system 120 may obtain data from a variety of sources, including one or more of inventory companies 140, manufacturers 150, sales data companies 160, financial institutions 182, DMVs 180, external data sources 184 or computer systems 132 at dealers 130 and store such data in data store 122. This data may be then grouped, analyzed or otherwise processed by vehicle data system 120 to determine desired data 126 or models 128 which are also stored in data store 122.

A user at computing device 110 may access the vehicle data system 120 through the provided interfaces 192 and specify certain parameters, such as a desired vehicle configuration or incentive data the user wishes to apply, if any. The vehicle data system 120 can select a particular set of data in the data store 122 based on the user specified parameters, process the set of data using processing module 196 and models 128, generate interfaces using interface module 192 using the selected data set and data determined from the processing, and present these interfaces to the user at the user's computing device 110 or through dealer computers 132. More specifically, in one embodiment interfaces 192 may visually present the selected data set to the user in a highly intuitive and useful manner.

Turning to the various other entities in topology 100, dealer 130 (e.g., dealers 130a, 130b ... 130n) may be a retail outlet for vehicles manufactured by one or more of OEMs 150. To track or otherwise manage sales, finance, parts, service, inventory and back office administration needs dealers 130 may employ a dealer management system (DMS) 132 (e.g., 132a, 132b ... 132n). Since many DMS 132 are Active Server Pages (ASP) based, transaction data 134 (e.g., 134a, 134b ... 134n) may be obtained directly from the DMS 132 with a "key" (for example, an ID and Password with set permissions within the DMS system 132) that enables data to be retrieved from the DMS system 132. Many dealers 130 may also have one or more web sites which may be accessed over network 170, where pricing data pertinent to the dealer 130 may be presented on those web sites, including any pre-determined, or upfront, pricing.

This price is typically the "no haggle" (price with no negotiation) price and may be deemed a "fair" price by vehicle data system 120.

Additionally, a dealer's current inventory may be obtained from a DMS 132 and associated with that dealer's information in data store 122. A dealer 130 may also provide one or more upfront prices to operators of vehicle data system 120. Each of these upfront prices may be associated with a vehicle configuration such that a list of vehicle configurations and associated upfront prices may be associated with a dealer in data store 122. This upfront price may, in one embodiment, comprise an offset from an inventory price for the vehicle configuration. It will be noted that an upfront price may be provided at almost any level of granularity desired. For example, a single upfront price may correspond to all vehicles of a particular make sold by the dealer, to all vehicles of a particular make and model sold by the dealer, to all vehicles of a particular make, model and trim sold by the dealer, etc.

Inventory companies 140 may be one or more inventory polling companies, inventory management companies or listing aggregators which may obtain and store inventory data from one or more of dealers 130 (for example, obtaining such data from DMS 132). Inventory polling companies are typically commissioned by the dealer to pull data from a DMS 132 and format the data for use on websites and by other systems. Inventory management companies manually upload inventory information (photos, description, specifications) on behalf of the dealer. Listing aggregators get their data by "scraping" or "spidering" websites that display inventory content and receiving direct feeds from listing websites (for example, Autotrader, FordVehicles.com).

DMVs 180 may collectively include any type of government entity to which a user provides data related to a vehicle. For example, when a user purchases a vehicle it must be registered with the state (for example, DMV, Secretary of State, etc.) for tax and titling purposes. This data typically includes vehicle attributes (for example, model year, make, model, mileage, etc.) and sales transaction prices for tax purposes. Thus, data obtained 124 from the DMVs 180 may include vehicle registrations from dealers 130, including the dealer (or dealer location) from which a vehicle was purchased, the zip code or address of the consumer who purchased the vehicle, the date of the sales transaction, etc.

Financial institution 182 may be any entity such as a bank, savings and loan, credit union, etc. that provides any type of financial services to a participant involved in the purchase of a vehicle. For example, when a buyer purchases a vehicle they may utilize a loan from a financial institution, where the loan process usually requires two steps: applying for the loan and contracting the loan. These two steps may utilize vehicle and consumer information in order for the financial institution to properly assess and understand the risk profile of the loan. Typically, both the loan application and loan agreement include proposed and actual sales prices of the vehicle.

Sales data companies 160 may include any entities that collect any type of vehicle sales data. For example, syndicated sales data companies aggregate new and used sales transaction data from the DMS 132 systems of particular dealers 130. These companies may have formal agreements with dealers 130 that enable them to retrieve data from the dealer 130 in order to syndicate the collected data for the purposes of internal analysis or external purchase of the data by other data companies, dealers, and OEMs.

Manufacturers 150 are those entities which actually build the vehicles sold by dealers 130. In order to guide the pricing of their vehicles, the manufacturers 150 may provide an Invoice price and a Manufacturer's Suggested Retail Price (MSRP) for both vehicles and options for those vehicles—to be used as general guidelines for the dealer's cost and price. These fixed prices are set by the manufacturer and may vary slightly by geographic region.

External information sources 184 may comprise any number of other various source, online or otherwise, which may provide other types of desired data, for example data regarding vehicles, pricing, demographics, economic conditions, markets, locale(s), consumers, etc.

It should be noted here that not all of the various entities depicted in topology 100 are necessary, or even desired, in embodiments of the present invention, and that certain of the functionality described with respect to the entities depicted in topology 100 may be combined into a single entity or eliminated altogether. Additionally, in some embodiments other data sources not shown in topology 100 may be utilized. Topology 100 is therefore exemplary only and should in no way be taken as imposing any limitations on embodiments of the present invention.

At certain intervals, vehicle data system 120 may obtain by gathering (for example, using an interface of interface module 192 to receive or request) data from one or more of inventory companies 140, manufacturers 150, sales data companies 160, financial institutions 182, DMVs 180, external data sources 184 or dealers 130. This data may include sales or other historical transaction data for a variety of vehicle configurations, inventory data, registration data, finance data, vehicle data, incentive data and other data.

It should be noted that differing types of data may be obtained at different time intervals, where the time interval utilized in any particular embodiment for a certain type of data may be based, at least in part, on how often that data is updated at the source, how often new data of that type is generated, an agreement between the source of the data and the providers of the vehicle data system 120 or a wide variety of other factors. The data collected from these various data sources distributed across the network may thus be used to enhance or augment previously stored data records, allowing the use of centralized data store or the like, even in cases where the data must be collected at different time intervals from various data sources distributed across a networked computing environment.

Once such data is obtained and stored in data store 122, it may be analyzed and otherwise processed to yield data sets corresponding to particular vehicle configurations (which may include, for example, include vehicle make, model, power train, options, etc.) and geographical areas (national, regional, local, city, state, zip code, county, designated market area (DMA), or any other desired geographical area). It will be understood that although certain geographic areas are used in association with some of the following descriptions in association with particular embodiments (e.g., zip code) almost any desired geographic area may be utilized in other embodiments and the use of a particular geographic area in the description of certain embodiments should not be taken in any way as a limitation generally on other embodiments.

In one embodiment, the obtained data 124 or the determined data 126 may include a zip code or address (or other indicator of geographic location) for each of a set of vehicle dealers 130. These vehicle dealers may be all the dealers in a geographic area (such as nationally), or dealers 130 associated with a particular network of dealers (e.g., True-Car dealer network) or both. Moreover, sales or transaction data associated with vehicle sales at the set of vehicle dealers 130 may also be stored in the obtained data 124. This sales or transaction data may include data on a set of vehicle sales, each vehicle sale corresponding to a vehicle sale of a vehicle make and model occurring at a dealer and may be associated with, for example, a sales price, a buyer's address or location, etc.

According to some embodiments, the obtained data 124 may include historical data which may be obtained from an aggregator or provider of industry data, such as Polk. In such embodiments, the raw historical data may be provided in a tabular format, a portion of which may include data as shown below, where each row represents one transaction.

| Registration Year Month | Make | Customer Zip code | Dealer Zip code | Dealer Address |
|---|---|---|---|---|
| 201611 | Toyota | 90024 | 90401 | 120 Broadway 90024 Santa Monica CA |
| ... | ... | ... | ... | ... |

Additionally, for every zip code (or other geographic indicator) the centroid (e.g., latitude and longitude) of the zip code may be stored (e.g., in obtained data 124 or determined data 126). In particular, in one embodiment this data may be stored in a lookup table such that the distance from every dealer to any other dealer may be determined or the distance from any dealer to a zip code (e.g., the centroid of a zip code) may be determined. According to some embodiments, the determined distance from a dealer's longitude and latitude to the centroid of a zip code may be referred to as the "DLR-ZIP".

Using the obtained data 124 or the determined data 126 one or more competition zone indices may be calculated. In one embodiment, a competition zone index is an indicator of competitiveness for dealers defined at zip code level and with respect to the surrounding competition. A competition zone index or value may take at least two formulations, namely a Dealer Competition Zone (DCZ) index (sometimes just referred to as a DCZ) and a Customer Competition Zone (CCZ) index (sometimes just referred to as a CCZ). The former may quantify how competitive a single dealer is in some specific zip code, while the latter may quantify a set of dealers with respect to another set of dealers (e.g., who may or may not be a participant in a dealer network such as the TrueCar network). These DCZ or CCZ metrics may be stored in the determined data 126. For example, for a dealer, that dealer may be associated with a DCZ value for each of a set of zip codes for each of a set of makes associated with the dealer (e.g., for each make, an associated DCZ value for the dealer in each zip code).

For either of these two types of competition zones indices, the index may be calculated for a specific make (e.g. a dealer who sells both Ford and Toyota vehicles may have separate index values for Ford different from Toyota) based on: 1) distances between zip codes and dealerships of a make, and 2) a set of typical distances traveled by customers of each zip code to buy cars of that make. These typical distances may serve as local normalization factors. They may be defined in different ways in particular embodiments. In one embodiment, the median distance as computed from historical transactions may be used. Mean distance may also be utilized, among other determinations of distance. If there are too few (or zero) sales or transaction records to compute mean and median, the value may be imputed or defined as a weighted average of the closest dealers to a zip code.

In one embodiment, a DCZ may be a non-dimensional real number determined for one or more dealers with respect to a zip code (e.g., in which a dealer or a potential consumer may reside) and a make. In particular, in one embodiment, a DCZ may be determined for each dealer (e.g., each dealer within a network) and each zip code. Specifically, in one embodiment, for a dealer d selling make m and a ZIP Code z, DCZ is defined by $$DCZ(z, d, m) = \frac{distance_{z,d} - distance_{z,closestdealertozexcludingd}}{\text{distance traveled from } z \text{ to buy } m} \quad (EQ1)$$

The denominator allows normalization across different geographical regions. This distance may, for example, be a median or mean distance driven. In an urban area the median distance will be significantly smaller than in a rural area. In zip codes with a negative DCZ, the dealer for whom the metric is being calculated may be the closest; as the DCZ increases the dealer may be farther to the consumer compared to other dealers.

The DCZ may be utilized to classify the zip code of interest into a zone for the dealer, as will be discussed, or may be used in one or more other calculations or determinations. For example, the DCZ values for one or more dealers can be used to define dealers' areas of influence (e.g., associated with certain zip codes). In particular, the DCZ for a dealer may be used to define or classify zip codes into different zones of comparative advantage or disadvantage. These zone labels or classifications may be associated with the dealer, the make and the zip code in determined data 126.

In one particular embodiment, the DCZ or CCZ values for a dealer for a make and zip code may be used to define one or more zone labels for the dealer for that make and zip code. For example, these zones may include one or more 'backyard' zones for the dealer where the dealer has a geographical advantage compared to the competition; one or more 'competition' zones (also referred to as 'competitive' zones) for the dealer where the dealer is at a comparable distance with other dealers; and one or more 'conquest' zones for the dealer where the dealer is at a disadvantage in terms of distance. Different, fewer or additional zones may also be utilized based on the DCZ or CCZ values for a dealer for a make and a zip code. For example, instead of a single 'conquest' zone for use with geographic areas (e.g., zip code) where the dealer is at a disadvantage in terms of distance; 'conquest far' and 'conquest near' zones may be utilized, both designating that the dealer is at a disadvantage, but denoting a comparative advantage or disadvantage between the 'conquest near' and 'conquest far' zones.

These types of zones (e.g., zone labels) may be assigned to each zip code in association with the dealer based on that dealer's DCZ or CCZ determined for that zip code and make. Thus, for each zip code and make sold by the dealer, the zip code may be assigned a zone label (e.g., backyard, competitive, conquest, conquest far, conquest near or the like) for that dealer based on the value of the DCZ or CCZ determined for that dealer for that make and zip code. These zones allow dealers to better understand their market and allow better evaluation of dealer performance.

At some point then, a user at a computing device 110 may access vehicle data system 120 using one or more interfaces provided by interface module 192, such as a set of web pages provided by vehicle data system 120. This user may be associated with a dealer 130 and may thus access a dealer interface provided by the vehicle data system 120. The dealer interface may allow a user affiliated, or otherwise associated with, the dealer 130 to access or otherwise request data stored by the vehicle data system 120 associated with that dealer (or in certain cases other dealers), vehicle data, data associated with that dealer's network, or other data of interest to a dealer.

As a user interacts with vehicle data system 120 via the interface (e.g., the dealer interface), vehicle data system 120 may collect or determine a set of features or data (terms used here interchangeably) associated with the dealer. These features may be determined based on, for example, an identification of the dealer based upon a user authentication or other data. The observable features may be determined in the context of a single session or across sessions and may include information related to that dealer, including the dealer's DCZ or CCZ values for one or more zip codes and makes, the zone label assigned to a dealer for one or more zip codes or makes, or other data obtained or determined that may be of interest to a user associated with the dealer 130. This data may include data determined in real-time as the user is accessing the vehicle data system 120 through a web based interface or may be one or more components previously determined and stored by the vehicle data system 120.

These features, or some portion of the determined features, associated with the dealer can be presented to the user in a visual display in real-time, or may be used to determine, in real-time data to be presented to the user in a visual display. For example, a graphical display in an interface presented to a user may present the zone labels for a set of zip codes in the vicinity of the dealer. Such a presentation may include, for example, a depiction of a zip code map and a color coded presentation of the zone labels along with graphical depiction of the various dealers in the geographic region. Graphical depictions may also be used in the interface to depict other features for the dealer (or other dealers), such as color coded depictions of close rate or relative performance, etc. Features associated with the dealer, including textual display of data associated with the determination of the DCZ values, CCZ values, zone labels or other data may also be presented in the interface. These and other aspects of various embodiments are discussed further below.

Figure 2A:
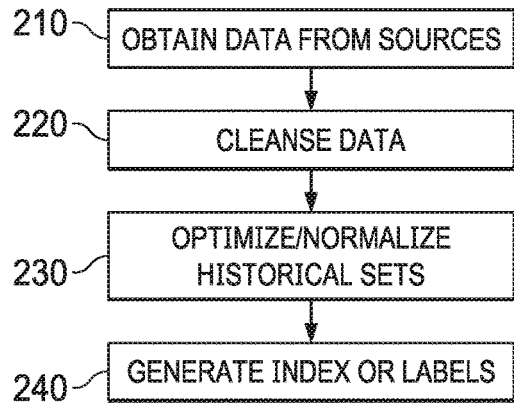
FIGS. 2A and 2B depict one embodiment of a method for determining, utilizing and presenting index values or zone labels.
Figure 2B:
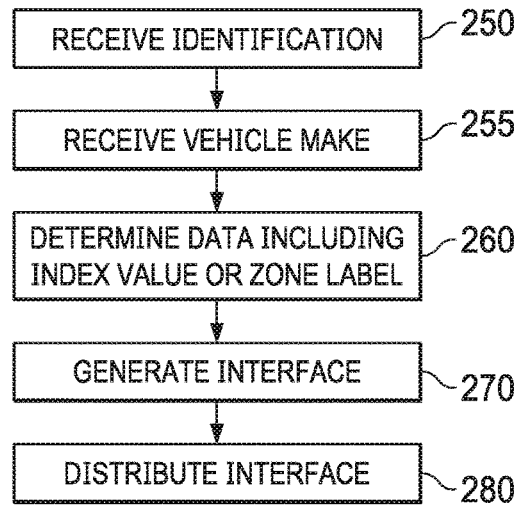

Turning now to FIGS. 2A and 2B, aspects of the operation of a vehicle data system are depicted. Referring first to the embodiment of FIG. 2A, at step 210 data can be obtained from one or more of the data sources (e.g., inventory companies 140, manufacturers 150, sales data companies 160, financial institutions 182, DMVs 180, external data sources 184, used car data sources 186, dealers 130, etc.) coupled to the vehicle data system 120 and the obtained data can be stored in the associated data store 122. In particular, obtaining data may comprise gathering the data by requesting or receiving the data from a data source. It will be noted with respect to obtaining data from data sources that different data may be obtained from different data sources at different intervals, and that previously obtained data may be archived before new data of the same type is obtained and stored in data store 122. The data collected from these various data sources distributed across the network may thus be used to enhance or augment previously stored data records, allowing the use of centralized data store or the like, even in cases where the data must be collected at different time intervals from various data sources distributed across a networked computing environment.

In certain cases, some of the operators of these data sources may not desire to provide certain types of data, especially when such data includes personal information or certain vehicle information (VIN numbers, license plate numbers, etc.). However, in order to correlate data corresponding to the same person, vehicle, etc. obtained from different data sources and enhance certain data records, it may be desirable to have such information. To address this problem, operators of these data sources may be provided a particular hashing algorithm and key by operators of vehicle data system 120 such that sensitive information in data provided to vehicle data system 120 may be submitted and stored in data store 122 as a hashed value. Because each of the data sources utilizes the same hashing algorithm to hash certain provided data, identical data values will have identical hash values, facilitating matching or correlation between data obtained from different (or the same) data source(s). Thus, the data source operators' concerns can be addressed while simultaneously avoiding adversely impacting the operation of vehicle data system 120.

Once data is obtained and stored in data store 122, the obtained data may be cleansed at step 220. The cleansing of this data may include evaluation of the data to determine if it conforms to known values, falls within certain ranges or is duplicative. When such data is found, it may be removed from the data store 122, the values which are incorrect or fall outside a threshold may be replaced with one or more values (which may be known specifically or be default values), or some other action entirely may be taken.

At step 230, the cleansed data may be optimized, and where appropriate, normalized and used to form sample sets of data. Normalization may include converting historical sales data which is expressed in dollars or other currencies into price ratios comprising the sale price divided by the MSRP, upfront price (UFP) or other reference value. In this way, historical sales data may be normalized. Normalization may also include performing adjustments (e.g., applying one or more adjustment factors) to account for inherent differences in how vehicle prices are reported. The application of such adjustment factors may prevent the differing (or changing) percentages of data coming from each source from impacting the accuracy of results.

Optimization may include grouping data into data sets according to geography (for example, national, regional, local, state, county, zip code, DMA, some other definition of a geographic area, such as within 500 miles of a location, etc.) and optimizing these geographic data sets for a particular vehicle configuration. In the case of used vehicles, the optimization may further comprise grouping data into sets according to mileage, condition or other parameters of particular interest to buyers and sellers of used vehicles. This optimization process may result in one or more data sets corresponding to a particular vehicle or group or type of vehicles, a set of attributes of a vehicle and an associated geography.

In one embodiment, the obtained data or the determined data may include a zip code or address (or other indicator of geographic location) for each of a set of vehicle dealers 130. These vehicle dealers may be all the dealers in a geographic area (such as nationally), or dealers 130 associated with a particular network of dealers (e.g., TrueCar dealer network) or both. Moreover, sales or transaction data associated with vehicle sales at the set of vehicle dealers 130 may also be stored in the obtained data. This sales or transaction data may include data on a set of vehicle sales, each vehicle sale corresponding to a vehicle sale of a vehicle make and model occurring at a dealer and may be associated with, for example, a sales price, a buyer's address or location, etc.

Using the data sets resulting from the optimization process, one or more competition zone indices may be calculated. As discussed above, a competition zone index is an indicator of competitiveness for dealers defined at zip code level and with respect to the surrounding competition. A competition zone index or value may take at least two formulations, namely a DCZ index and a CCZ index. The former may quantify how competitive a single dealer is in some specific zip code, while the latter may quantify a set of dealers with respect to another set of dealers (e.g., who may or may not be a participant in a dealer network such as the TrueCar network). These DCZ or CCZ metrics may be stored in the data store. For example, for a dealer, that dealer may be associated with a DCZ or CCZ value for each of a set of zip codes for each of a set of makes associated with the dealer (e.g., for each make, an associated DCZ or CCZ value for the dealer in each zip code).

Additionally, in one particular embodiment, the DCZ or CCZ values for a dealer for a make and zip code may be used to define one or zone labels for the dealer for that make and zip code. For example, these zones may include one or more 'backyard' zones for the dealer where the dealer has a geographical advantage compared to the competition; one or more 'competitive' zones for the dealer where the dealer is at a comparable distance with other dealers; and one or more 'conquest' zones or 'conquest near' and 'conquest far' zones for the dealer where the dealer is at a disadvantage in terms of distance. Different, fewer or additional zones may also be utilized based on the DCZ or CCZ values for a dealer for a make and a zip code.

Moving on to the portion of the embodiment depicted in FIG. 2B, at step 250 the vehicle data system 120 may receive an identification of a dealer of interest or zip code of interest through a provided interface 192. In one embodiment, for example, a user at a web page provided by vehicle data system 120 may select a zip code or provide a dealer identification using one or more menus or may navigate through a set of web pages to provide the specific vehicle configuration. At step 255, the user may also specify a vehicle make of interest, and in some embodiments, a make of interest or a date range of interest.

Geographic or sales data may then be determined by the vehicle data system 120 at step 260. This data may include transaction data or geographic data for the dealer of interest or other dealers associated with the make of interest or provided zip code or other zip codes or makes. The data may also include the determination of one or more of a CCZ index value, a DCZ index value or a zone label for one or more zip codes of interest. For example, a number of zip codes within a certain distance of the zip code of the dealer.

An interface for presentation of any determined index values or zone labels for one or more zip codes or makes may then be generated at step 270. These interfaces may comprise a visual presentation of such data using, for example, coded maps, line charts, bar charts, histograms, Gaussian curves with indicators of certain price points, graphs with trend lines indicating historical trends or price forecasts, or any other desired format for the visual presentation of data. In particular, in one embodiment, a graphical display in an interface presented to a user may present zone labels for a set of zip codes in the vicinity of the dealer. Such a presentation may include, for example, a depiction of a zip code map and a color coded presentation of the zone labels along with graphical depiction of the various dealers in the geographic region. Graphical depictions may also be used in the interface to depict other features for the dealer (or other dealers), such as color coded depictions of close rate or relative performance, etc. Features associated with the dealer, including textual display of data associated with the determination of the DCZ values, CCZ values, zone labels or other data may also be presented in the interface.

The interfaces may be distributed through a variety of channels at step 280. The channels may comprise a consumer-facing network based application (for example, a set of web pages provided by vehicle data system 120 which a consumer may access over a network at a computing device such as a computer or mobile phone and which are tailored to the desires of, or use by, consumers); a dealer facing network based application (a set of web pages provided by the vehicle data system 120 which are tailored to the desires of, or use by, dealers); text or multimedia messaging services; widgets for use in web sites or in other application settings, such as mobile phone applications; voice applications accessible through a phone; or almost any other channel desired. It should be noted that the channels described here, and elsewhere, within this disclosure in conjunction with the distribution of data may also be used to receive data (for example, a user specified vehicle configuration or the like), and that the same or some combination of different channels may be used both to receive data and distribute data.

As may be apparent from a review of the above discussion, embodiments of vehicle data system 120 may entail a number of processes occurring substantially simultaneously or at different intervals and that many computing devices 110 may desire to access vehicle data system 120 at any given point. Accordingly, in some embodiments, vehicle data system 120 may be implemented utilizing an architecture or infrastructure that facilitates cost reduction, performance, fault tolerance, efficiency and scalability of the vehicle data system 120.

Figure 3:
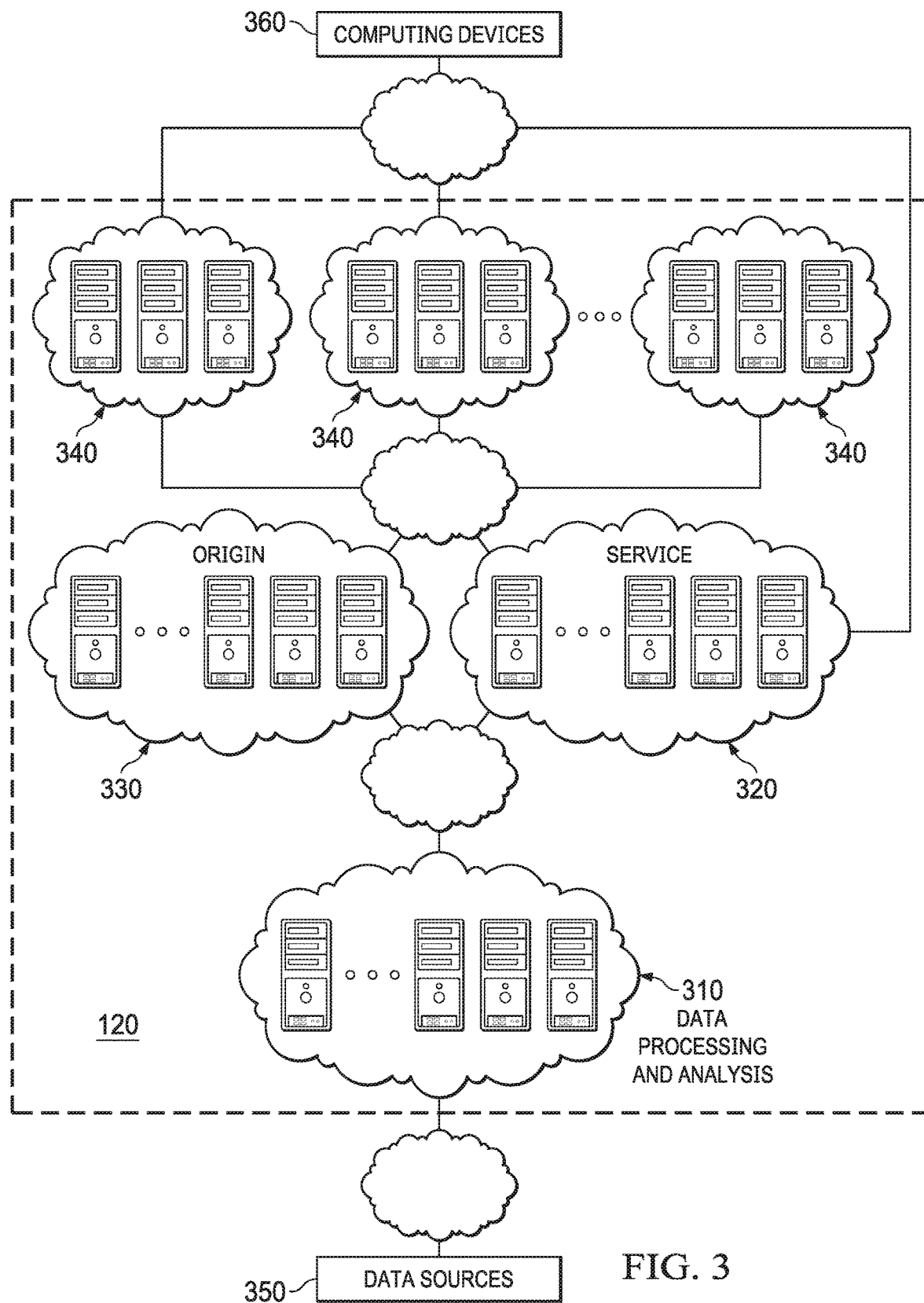
FIG. 3 depicts one embodiment of an architecture for a vehicle data system.

One embodiment of such an architecture is depicted in FIG. 3. Specifically, one embodiment of vehicle data system 120 may be operable to provide a network based interface including a set of web pages accessible over the network, including web pages where a user can specify a desired vehicle configuration and receive pricing data corresponding to the specified vehicle configuration. Such a vehicle data system 120 may be implemented utilizing a content delivery network (CDN) comprising data processing and analysis servers 310, services servers 320, origin servers 330 and server farms 340 distributed across one or more networks, where servers in each of data processing and analysis servers 310, services servers 320, origin servers 330 and server farms 340 may be deployed in multiple locations using multiple network backbones or networks where the servers may be load balanced.

The vehicle data system may include a back-end comprising data processing and analysis servers 320 which may interact with one or more data sources 350 (examples of which are discussed above) to obtain data from these data sources 350 at certain time intervals (for example, daily, weekly, hourly, at some ad-hoc variable interval, etc.) and process this obtained data as discussed both above in more detail later herein. This processing includes, for example, the cleansing of the obtained data, determining and optimizing sample sets, the generation of models, etc.

The back-end may also include origin servers 330 which may populate a web cache at each of server farms 340 with content for the provisioning of the web pages of the interface to users at computing devices 360 (examples of which are discussed above). Server farms 340 may provide the set of web pages to users at computing devices 110 using web caches at each server farm 340. More specifically, users at computing devices 360 connect over the network to a particular server farm 340 such that the user can interact with the web pages to submit and receive data through the provided web pages. In association with a user's use of these web pages, user requests for content may be algorithmically directed to a particular server farm 340. For example, when optimizing for performance locations for serving content to the user may be selected by choosing locations that are the fewest hops, the fewest number of network seconds away from the requesting client or the highest availability in terms of server performance (both current and historical), so as to optimize delivery across the network.

Certain of the web pages or other interfaces provided by vehicle data system 120 may allow a user to request services, interfaces or data which cannot be provided by server farms 340, such as requests for data which is not stored in the web cache of server farms 340 or analytics not implemented in server farms 340. User requests which cannot be serviced by server farm 340 may be routed to one of service servers 330. These requests may include requests for complex services which may be implemented by service servers 330, in some cases utilizing the data obtained or determined using data processing and analysis servers 310.

Figure 4:
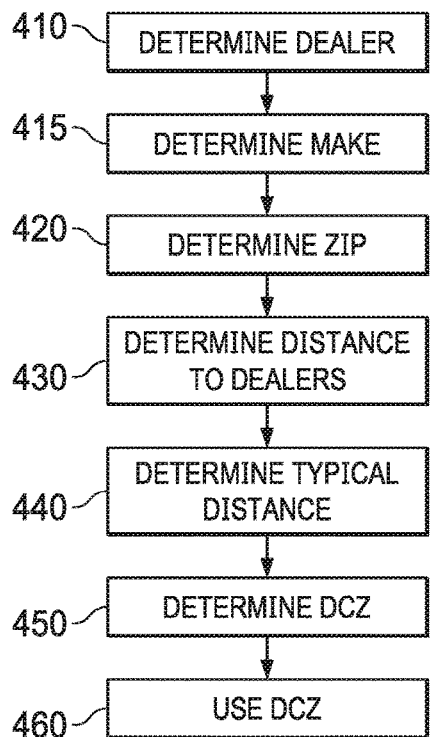
FIG. 4 is a flow diagram of one embodiment of a method for determining DCZ.

Turning now to FIG. 4, a flow diagram for one embodiment of a method of determining and utilizing a DCZ is depicted. Such a method may be, for example, employed by a vehicle data system in determining features associated with a dealer. In particular, an embodiment of such a method may be utilized when determining DCZ values for a set of dealers for a set of makes for a set of geographical locations (e.g., zip codes).

Initially, at step 410 a dealer of interest may be determined. This dealer may be provided through an input from an interface offered by a vehicle data system to a consumer or dealer, or may be part of a regularly executed determination of DCZs for one, a number of, or all of a set of dealers (e.g., all dealers in a geographic area or within a dealer network, etc.).

A make of interest may also be determined at step 415. The dealer of interest is associated with a make for which it is a dealer. This make may be utilized as the make of interest. If the dealer is a dealer for multiple makes, multiple DCZs for the dealer may be determined for each make which the dealer carries, a subset of these makes, or only for the particular make of interest.

At step 420, a zip code of interest may be determined. As the purpose of determining DCZ for a dealer may be to determine the competitive zones for a dealer, a DCZ may be determined for a dealer with respect to each zip code in a set of zip codes. In one embodiment, the set of zip code may be all the zip code in the country or a subset of zip code within a certain distance of the zip code in which the dealer of interest resides. Thus, to determine a zip code of interest, a zip code may be selected from the set of zip codes.

At step 430 the distance from the zip code of interest (e.g., as determined at step 420) to each of the available dealers (including the dealer of interest) for the make of interest (e.g., as determined at step 415) associated with the dealer of interest is determined. Again, the number of available dealers for which the distance is determined may be all the dealers in a geographic region (e.g., nationally, state wide, confined to some distance of the zip code of interest, etc.). This distance data may be, for example, have been previously obtained from map data or the like and stored at a vehicle data system.

At step 440 then, a typical distance for the zip code of interest may be determined. This typical distance may be a measure of the typical distance a consumer in the zip code of interest would travel to purchase a vehicle of the make of interest (e.g., the make associated with the dealer of interest as determined at step 415). This typical distance may be determined from historical transaction records for consumers living in the zip code of interest as determined from records of the DMV, dealers or other data sources. In some embodiments, the historical transaction data used to make a determination for the typical distance may be constrained by time such that only historical transaction data from within a certain time frame (e.g., two years) may be utilized.

Using this historical transaction data, a vector of distances for sales at each of the available dealers (e.g., for which a distance was determined in step 430) may be determined. The vector may include a set of distances, where each distance in the vector is a distance traveled by a consumer in the zip code of interest to purchase a vehicle of the make of interest. As discussed, a median distance of the vector of distances may be used as the typical distance. Mean distance of the vector of distances may also be used as the typical distance. Other determinations of the typical distance may be utilized in other embodiments and are fully contemplated herein.

In one embodiment, a threshold number of vehicle sales may be utilized. This threshold may be 10 sales, 50 sales, 100 sales or some other threshold. If there are too few records of sales (e.g., less than the threshold number of vehicle sales) to compute a typical distance (e.g., mean or median), the typical distance can be determined as a weighted average of the distance of a number of closest dealers to a zip code. The number of closest dealer may be for example a number (e.g., 5, 10, 50, 100, etc.) of dealers closest to the zip code (e.g., the centroid of the zip code), or all dealers within a certain distance (e.g., 5 miles, 10 miles, 50 miles, etc.) of the zip code of interest.

At step 450 then, the DCZ for the dealer of interest, make of interest and the zip code of interest can be determined according to EQ1 above by using the distance from the zip code of interest to the dealer of interest, the distance from the zip code of interest to the closest available dealer (excluding the dealer of interest), and the typical distance.

At step 460, the DCZ value may be used in a variety of contexts to account for the competitiveness of that dealer with respect to the specific geography (e.g., zip code of interest). The use of the DCZ may include the classification or qualification or quantization of new or previously determined data based on the DCZ. For example, in one embodiment, the determined DCZ value for the zip code of interest for the dealer of interest and make of interest may be utilized to classify the zip code of interest into a zone (e.g., to assign a zone label to the zip code) associated with the dealer of interest and make of interest, as has been discussed, or may be used in one or more other calculations or determinations.

In particular, in one embodiment, there may be a set of rules defining the assignment of a zone label to a zip code. These rules may define one or more thresholds or ranges of DCZ values and associated zone labels, such that if the DCZ value determined for a dealer with respect to a particular zip code and make exceeds or falls below a threshold, or falls within the range specified by the rule, the zip code may be associated with that zone label for that dealer and make. The classifications of one or more zip codes (e.g., based on the DCZ value for those zip codes associated with the dealer) may be presented to a user (e.g., associated with a dealer). The interface can, for example, present the zone labels for a set of zip codes in the vicinity of the dealer. Such a presentation may include, for example, a depiction of a zip code map and a color coded presentation of the zone labels along with graphical depiction of the various dealers in the geographic region. In this manner, a user associated with a dealer may be presented with an interface specifically tailored for that dealer.

Figure 5:
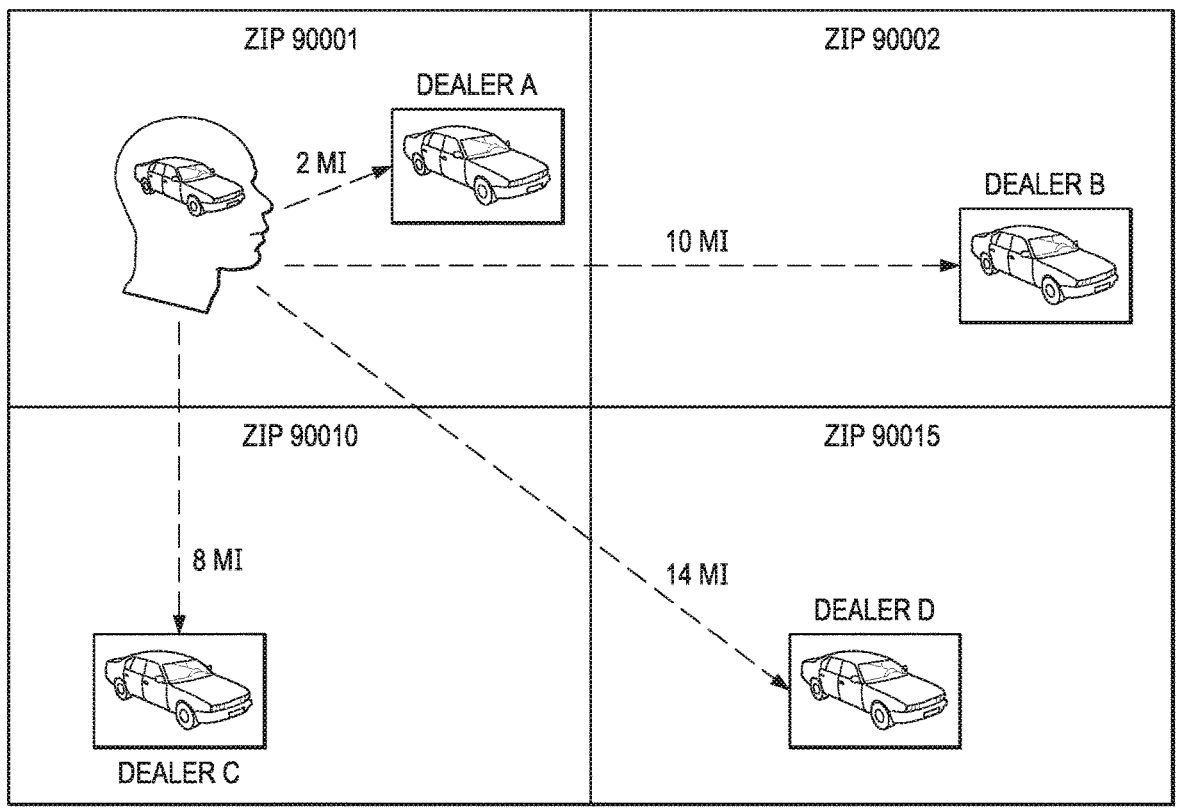
FIG. 5 is a block diagram of an example of geographic distribution for illustrating embodiments of methods of computing DCZ or CCZ.

FIG. 5 depicts a diagram useful in illustrating an example of a DCZ calculation for a particular dealer (e.g., a dealer of interest). Referring to FIG. 5 then, for purposes of the example assume the DCZ values for dealer A in zip code 90001 is being determined. First, all the distances from the zip code 90001 to the available dealers (in this example, dealers A, B, C, and D) for the same make for which dealer A is a dealer (e.g., a make of interest) can be determined. For purposes of this example, assume that dealers A, B, C and D are the only dealers of the make of interest within the geographic area of interest and the distances are those depicted in FIG. 3 (2 miles to dealer A, 10 miles to dealer B, 8 miles to dealer C and 14 miles to dealer D).

Then, the typical distance can be computed. For the sake of the example assume the following historical records for the make for consumers living in 90001: 10 sales at dealer A, 5 sales at dealer B, 3 sales at dealer C and no sales at dealer D. Then the vector of distances for the historical records (in miles) is [2,2,2,2,2,2,2,2,2,2,10,10,10,10,10,8,8,8]. The median value is 2 miles and the average is 5.22 miles. In this example, the median of these distances will be chosen as typical distance.

Next, the closest dealer to 90001 once dealer A removed can be found: this yields dealer C. Using EQ 1:

$$DCZ(\text{dealer } A, 90001) = \frac{2 \text{ mi} - 8 \text{ mi}}{2 \text{ mi}} = -3.0$$

Thus, according to his example the DCZ value for dealer A for the make of interest for zip code 990001 is −3.0.

Turning now to Customer Competition Zones, CCZs may be similar to DCZ but it is defined for competing sets of dealers (sets 1 and 2) and measures the competitiveness of one set of dealers (set 1) with respect to another (set 2) (e.g., with respect to one or more geographic regions). These two sets of dealers may be network dealers and non-network dealers or almost any two groups or sets of dealers desired to compare. Again, CCZ may be a non-dimensional real number.

In particular, in one embodiment, a CCZ may be determined for each make of interest and each zip code for a dealer set (relative to another dealer set). Specifically, in one embodiment, for make m and a zip code z, CCZ is defined by $$CCZ(\text{dealer set 1, zip, } m) = \frac{\text{distance} \begin{pmatrix} \text{closest dealer} \\ \text{of set 1, zip} \end{pmatrix} - \text{distance} \begin{pmatrix} \text{closest dealer} \\ \text{of set 2, zip} \end{pmatrix}}{\text{distance traveled from } z \text{ to buy } m} \quad (EQ2)$$

The denominator is the same as in the DCZ. As before, in one embodiment, if CCZ is negative, the closest dealer to the customer is a dealer of set 1; when CCZ increases the dealers of set 1 are in a relatively weaker position compared to the dealers of set 2.

Figure 6:
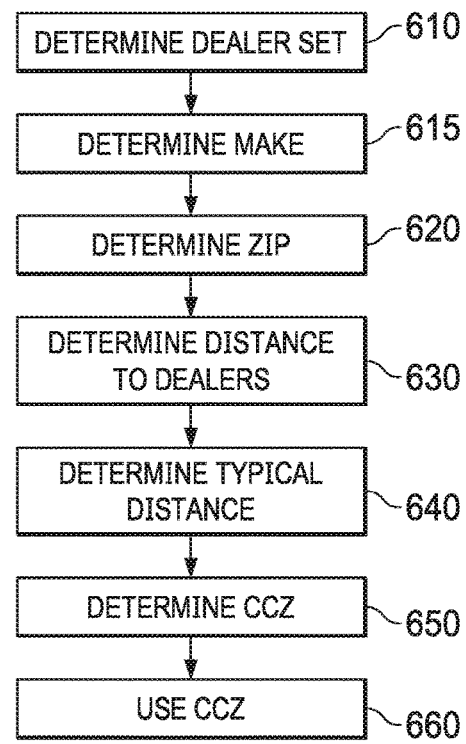
FIG. 6 is a flow diagram for one embodiment of a method for determining CCZ.

Turning now to FIG. 6 a flow diagram for one embodiment of a method of determining and utilizing a CCZ for a set of dealers with respect to a make is depicted. Such a method may be, for example, employed by a vehicle data system in determining features associated with a dealer or set of dealers. In particular, an embodiment of such a method may be utilized when determining CCZ values for a set of dealers for a set of makes for a set of geographical locations (e.g., zip codes).

Initially, at step 610 dealer sets of interest may be determined. These dealer sets may include, for example, a set of dealers that belong to a network of dealers (e.g., TrueCar dealers) and a set of non-network dealers. Other sets or divisions are imaginable and are contemplated herein. The sets of dealers may be defined or provided through an input from an interface offered by the vehicle data system to a consumer or dealer or may be part of a regularly executed determination of CCZ for a set of dealers (e.g., all dealers in a geographic area or within a dealer network, etc.).

A make of interest may also be determined at step 615. The dealer of the first set may be associated with one or more makes which those dealers sell. One of these makes may be selected as the make of interest. As the set of dealers may be dealers for multiple makes, multiple CCZs for the first set of dealers may be determined with respect to the zip code of interest for each make which the set of dealers carry, a subset of these makes, or only for the particular make of interest.

At step 620, a zip code of interest may be determined. As the purpose of a CCZ may be to determine how dealers within a particular set (the first set or set of interest) are faring with respect to dealers in another set (the second or other set), a CCZ may be determined for the set of dealers with respect to each zip code in a set of zip codes. In one embodiment, the set of zip codes may be all the zip codes in the country or a subset of zip codes. Thus, to determine a zip code of interest, a zip code may be selected from the set of zip codes.

At step 630 the distance from the zip code of interest to the nearest dealer (e.g., for the make of interest) in the set of interest and the distance from the zip code of interest to the nearest dealer (e.g., for the make of interest) in second set may be determined. This distance data may be, for example, have been previously obtained from map data or the like and stored at a vehicle data system.

At step 640 then, the typical distance for the zip code of interest may be determined. This typical distance may be a measure of the typical distance a consumer in the zip code of interest would travel to purchase a vehicle of the make of interest (e.g., the make associated with the first dealer set as determined at step 615). This typical distance may be determined from historical transaction records for consumers living in the zip code of interest as determined from records of the DMV, dealers or other data sources. In some embodiments, the historical transaction data used to make a determination for the typical distance may be constrained by time such that only historical transaction data from within a certain time frame (e.g., two years) may be utilized.

Using this historical transaction data, a vector of distances for each sale may be determined. Each distance in the vector is a distance traveled by a consumer in the zip code of interest to purchase a vehicle of the make of interest. As discussed, the median distance of the vector of distances may be used as the typical distance. Mean distance of the vector of distances may also be used. Other determinations of the typical distance may be utilized in other embodiments and are fully contemplated herein.

In one embodiment, a threshold number of vehicle sales may be utilized. This threshold may be 10 sales, 50 sales, 100 sales or some other threshold. If there are too few records of sales (e.g., less than the threshold number of vehicle sales) to compute a typical distance (e.g., mean or median), the typical distance can be determined as a weighted average of the distance of a number of closest dealers to a zip code. The number of closest dealer may be, for example, a number (e.g., 5, 10, 50, 100, etc.) of dealers closest to the zip code (e.g., the centroid of the zip code), or all dealers within a certain distance (e.g., 5 miles, 10 miles, 50 miles, etc.) of the zip code of interest.

At step 650 then the CCZ for the dealers in the first set of dealers for the make and the zip code of interest can be determined according to EQ2 above by using the distance from the zip code of interest to the nearest dealer of the first set of dealers, the distance from the zip code to the nearest dealer in the second set of dealers and the typical distance.

At step 660, this CCZ may be utilized in one or more other calculations or determinations. The use of the CCZ may include the classification or qualification or quantization of new or previously determined data based on the CCZ. For example, in one embodiment, the determined CCZ value for the zip code of interest for the set of dealers and make of interest may be utilized to classify the zip code of interest into a zone associated with set of dealers or may be used in one or more other calculations or determinations. As another example, the CCZ value in the zip code may be utilized to determine a predicted increase in sales from adding a dealer (e.g., a general dealer not already in a dealer network or a specific dealer) to a dealer network associated with the first set of dealers.

Referring back to FIG. 5, the same diagram may be useful in illustrating an example of a CCZ calculation for a set of dealers. Accordingly, assume for purposes of this example that dealers B and C belong to the TrueCar dealer network (the first set of dealers) and dealers A and D do not (the second set of dealers). As data related to how TrueCar performs in 90001 is desired, the closest TrueCar dealer (dealer C) and the closest non TrueCar dealer (dealer A) can be determined and EQ2 above applied: but centered on the first set of dealers and based on the closest dealers of each set:

$$CCZ(TrueCar, 90001) = \frac{\text{distance (dealer } C, 90001) - \text{distance (dealer } A, 90001)}{\text{typical distance for 90001}} = \frac{8 \text{ mi} - 2 \text{ mi}}{2 \text{ mi}} = 3.0$$

Notice that for both DCZ and CCZ, depending on how the distances are taken, it is possible that the typical distance may be zero. For example, if everything in a zip code is referenced by a single point (e.g. the centroid of the zip code) it follows customers buying in the same zip code they live in, and will appear to have displaced 0 miles. This can be corrected by replacing 0 miles by a positive value (e.g., 1 mile) to avoid division by zero.

CCZ may be used to assess the strengths and weaknesses of a dealer network, allowing easier identification of areas where the dealer network has a high or low penetration. This, in turn, may allow a dealer network to more optimally expand its coverage by adding dealerships in areas with weak coverage.

It may now be useful to discuss embodiments of the uses of the DCZ or CCZ in more detail. While these are some example uses of the DCZ and CCZ it will be understood that these indices may be used in a wide variety of calculations to account for geography or density of populations or dealerships. In particular, in one embodiment the two indices (e.g., DCZ and CCZ) as described above may facilitate comparisons of dealers across the country or may be used to normalize other calculations. In particular, both DCZ and CCZ enable more accurate performance predictions, reducing noise and accounting for local behavioral patterns. For example, a typical performance indicator is close rate, which can be modeled or predicted as a function of DCZ.

The DCZ or CCZ can also be used to define dealers' areas of influence (e.g., associated with certain zip codes). For example, the DCZ or CCZ for a dealer may be used to define different zones of comparative advantage or disadvantage. In one embodiment, the DCZ or CCZ for a dealer and make with respect to a zip code may be used to define or associate zone labels with that zip code for that dealer. For example, the CCZ or DCZ for a zip code may be utilized to define the zip code as a 'backyard' zone where the dealer has a geographical advantage compared to the competition, a 'competitive' zone where the dealer is at a comparable distance with other dealers and a 'conquest' zone where the dealer is in disadvantage in terms of distance. Different, fewer or additional zones may also be utilized based on the DCZ values for a dealer for a make and a zip code. Additionally, instead of a single 'conquest' zone for use with geographic areas (e.g., zip code) where the dealer is at a disadvantage in terms of distance; 'conquest far' and 'conquest near' zones may be utilized, both designating that the dealer is at a disadvantage, but denoting a comparative advantage or disadvantage between the 'conquest near' and 'conquest far' zones. These zones allow dealers to better understand their market and allow better evaluation of dealer performance.

Figure 7B:
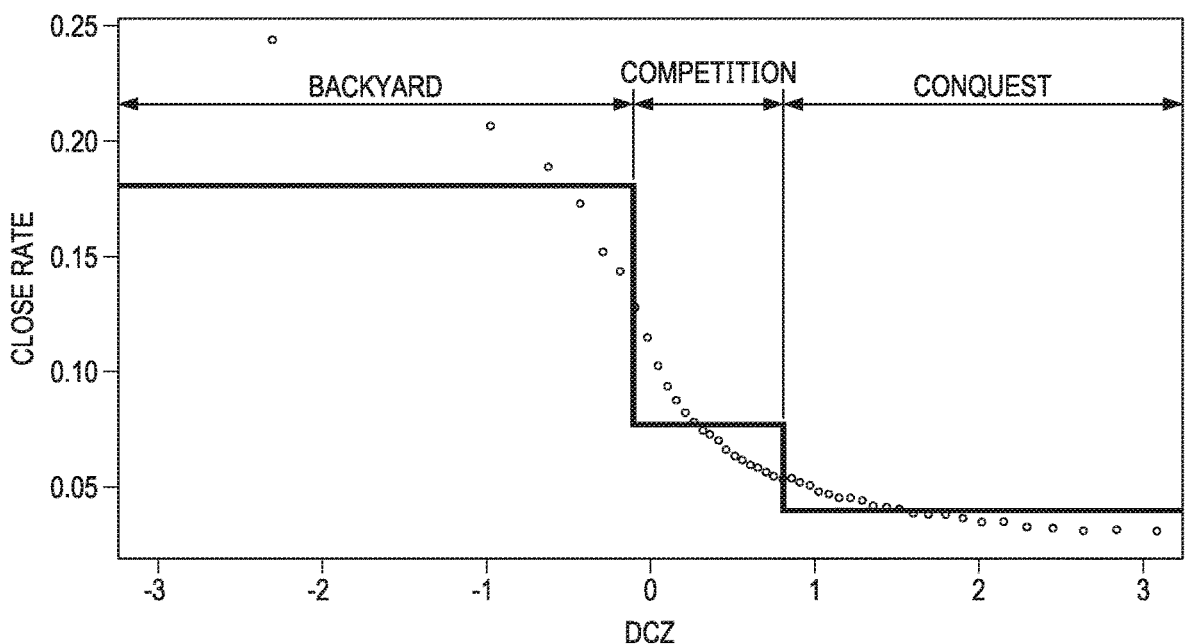
FIG. 7B is a diagram depicting an example of close rate as a function of DCZ and associated zone labels.
Figure 7A:
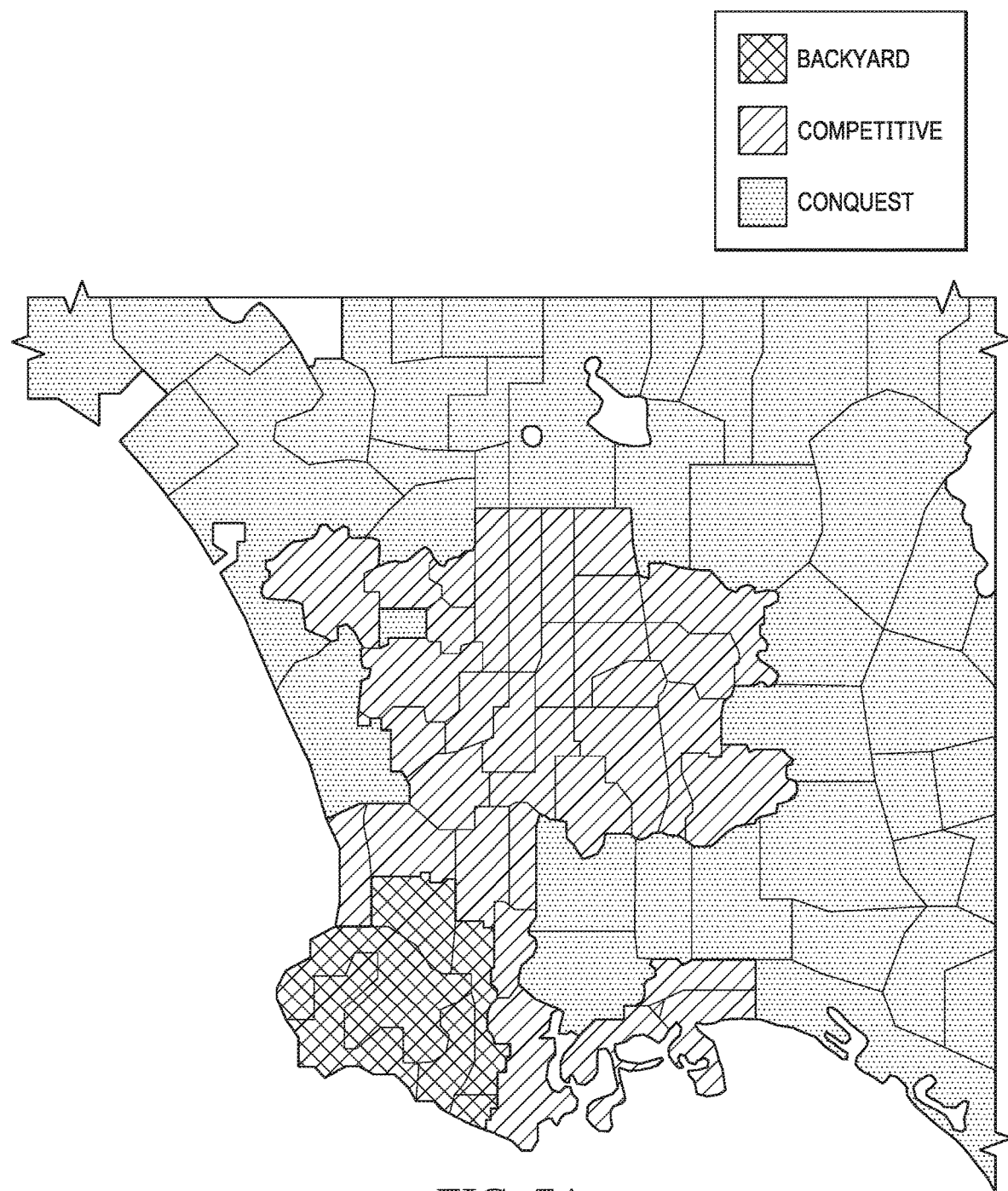
FIG. 7A is a diagram depicting an embodiment of competition zones.

Competitive zones values or labels can be used to create maps and aggregate the space into regions of similar performance for a dealer. This discretization can happen in different ways in different embodiments, but in one embodiment a small number of areas may be preferred since they better convey meaning to vehicle dealers. FIG. 7A shows an example of competitive zone labels for a dealer in zip code 90505. The area is discretized into backyard, competitive and conquest regions.

It will be noted that close rate can be modeled as a function of CCZ or DCZ. The definition of these zones in this example is tied to the DCZ-close rate relationship (as seen in FIG. 7B) and depends on a set of cutoff values that define what label to assign to zip code based on an associated DCZ value determined for a dealer in that zip code for a make. A similar exercise is possible for CCZ values. In other words, zones may be labeled for a dealer or set of dealers based on the DCZ values, DCZ close-rate relationship, CCZ values or the CCZ-close rate relationship.

As discussed, in one embodiment, the DCZ index provides a numerical value for each or, or a set of, the dealer-zip code pairs in the country for each of a set of makes. This index is then transformed into a categorical zone label ('backyard', 'competitive', 'conquest') that defines dealers' areas of influence. From a high level standpoint, the dealer's areas of influence can be interpreted in the following way (see e.g., FIG. 7B): the 'backyard' zone corresponds to the zip codes where the dealer has a geographical advantage compared to the competition; the 'competitive' zone corresponds to the zip codes where the dealer is at a comparable distance with other dealers; and the 'conquest' zone corresponds to the zip codes where the dealer is in disadvantage in terms of distance.

A two-step process may be used to convert the DCZ or CCZ Index for a zip code into these zip code labels for areas of influence. At step one a first set of temporary labels are defined for each dealer-zip code pair using the following logic:

| Index Range | Temporary Label |
| --- | --- |
| DCZ ≤ 0 | Backyard |
| 0 < DCZ ≤ 1 | Competitive |
| 1 < DCZ | Conquest |

In other words, if the DCZ value for a zip code for a dealer and make falls into a particular index range it is assigned the corresponding temporary label. This table corresponds to the depiction of competitive zones in FIGS. 7A and 7B. These definitions translate into index ranges the intuition described above: the backyard zone corresponds to the area where the dealer is the closest dealer to the customer; the competitive zone is the area where the dealer's distance to the customer is similar to the closest dealer's distance; and the conquest zone is the area where the dealer is farther from the customer compared to the competition.

In another embodiment, the labels may be assigned as follows, where the "conquest" zone has been broken up into two conquest zones, "conquest near" and "conquest far."

| Index Range | Temporary Label |
| --- | --- |
| DCZ ≤ 0 | Backyard |
| 0 < DCZ ≤ 1 | Competitive |
| 1 < DCZ ≤ 3 | Conquest Near |
| 3 < DCZ | Conquest Far |

At step two, one or more rules may be utilized to assign, define or refine competitive zones labels. As but one example, a rule may dictate that if a zip code is labeled as a backyard for one dealer it must be a conquest for all other competing dealers (e.g., of the same make). This rule translates the fact that the backyard zone should be the area where the dealer is in very clear advantage compared to the competition. In this area, he is not "competing" with other dealers.

In particular, after the temporary labeling defined in step one, it is possible that a zip code is labeled as backyard for one dealer and competition for at least another dealer. This case may be referred to as "conflict zip codes". In one embodiment, a second relabeling step is defined to take into account the business rule and solve the conflicts.

Consider a conflict zip code. Assume, for example, that dealer B has a DCZ value of $d_B \leq 0$ and that it is thus labeled as "backyard", and that dealer C has a DCZ value of $d_C \in [0,1]$ and it is labeled as competitive. There are two possible ways of solving the problem: 1) if dealer B has a significantly stronger influence than dealer C in the zip code, then the zip code label for dealer B should stay "backyard", and dealer C's label should be switched to "conquest" for the zip code, and 2) if dealer B and C seem to have a similar influence in the zip code, then both dealers should be considered as "competitive" for the zip code.

To measure dealers' "influence" in a conflict zip code two metrics may be analyzed in one embodiment: dealer market share and DCZ index value. The dealer market share at a zip code level is defined as:

$$Market_{Share(dealer,zip)} = \frac{\text{Number of vehicles sold by dealer to a customer in zip}}{\text{Number of vehicles bought by customers in zip}} \quad (EQ3)$$

Intuitively, a dealer with high market share is very influential in the zip code.

To re-label a zip code then (e.g., from the temporary label assigned to the zip code), the vehicle data system may employ relabeling rules that first looks at market share (when there are enough transactions in the zip codes for it to be meaningful). In one embodiment, these rules may specify that if dealer B has a significantly higher market share than dealer C, then dealer C is relabeled as conquest. Otherwise dealer B is relabeled as competitive.

In cases where there may not be sufficient transactions to compute a meaningful market share, the relabeling may be based on DCZ Index. The approach is similar: if dealer B has a very low DCZ value (which should indicate that it is significantly closer to the consumer) then dealer C is relabeled as conquest. Otherwise dealer B is relabeled as competitive.

In one particular embodiment the method for relabeling may be expressed as follows:

```
relabeling for zip,make considered as backyard for one
  dealer and competitive for at least one other dealer
(using temp_label)
variables:
total_sales: total sales for make m in zip code z
back_ms: market share for dealer considered as backyard in
  zip code z and make m
comp_ms: maximum (market share of dealers considered as
  competitive for zip code z and make m)
dcz_back: dcz index of dealer considered as backyard
min_dcz_comp: min dcz of dealers considered as competitive
parameters:
thres0=0
thresh1=1
MS_thresh1=40%
MS_thresh2=1.2
min_sales=50
def
winner(back_ms,comp_ms,total_sales,dcz_back,min_dcz_comp):
    if total_sales>=min_sales:
        if back_ms>=MS_thresh1:
            return "Backyard"
        elif back_ms>=MS_thresh2*comp_ms:
            return "Backyard"
        else:
            return "Competitive"
    else:
        if (thresh1-dcz_back)>=(thresh2-min_dcz_comp):
            return "Backyard"
        else:
            return "Competitive"
The previous function decides who is the 'winner' of the
conflict.
    if winner='Backyard' then the competitive zips gets
      relabeled as 'conquest'
    if winner='Competitive' then the backyard zip gets
      relabeled as 'competitive'
```

It may now be useful to illustrate how features determined for a dealer, including features based on DCZ values, CCZ values or zone labels determined in association for a dealer may be presented to a dealer through an interface by a vehicle data system. In one embodiment, for example, a graphical display in an interface presented to a user may present the zone labels for a set of zip codes in the vicinity of the dealer. Such a presentation may include, for example, a depiction of a zip code map and a coded presentation of the zone labels along with graphical depiction of the various dealers in the geographic region. Graphical depictions may also be used in the interface to depict other features for the dealer (or other dealers), such as coded depictions of close rate or relative performance, etc. Features associated with the dealer, including textual display of data associated with the determination of the DCZ values, CCZ values, zone labels or other data may also be presented in the interface.

Figure 8:
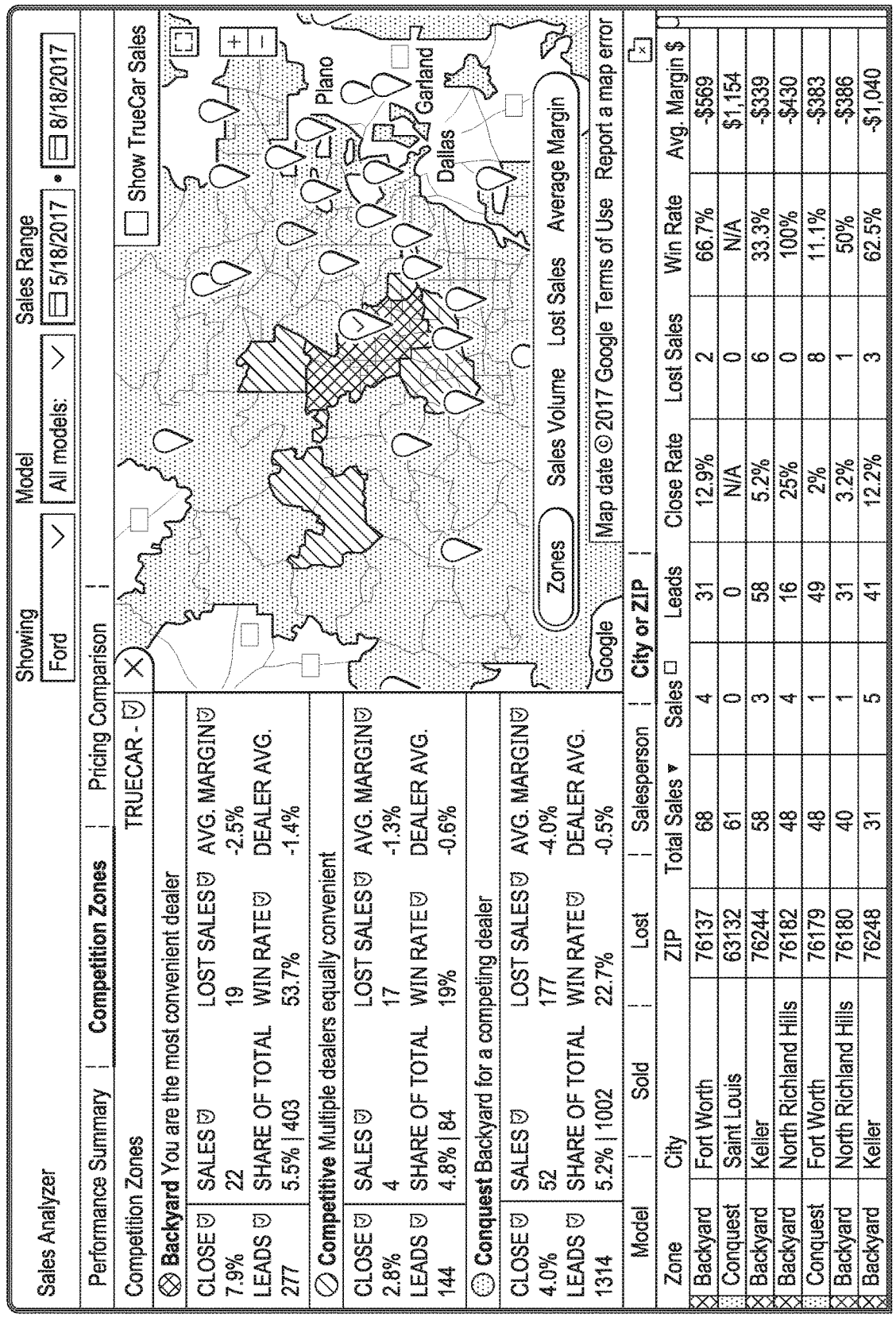
FIGS. 8 and 9 depict embodiments of interfaces that may be utilized by a vehicle data system.

FIG. 8 depicts one embodiment of such an interface. Embodiments of these types of interfaces may be presented as a portion of one or more tools that are offered to vehicle dealers (e.g., to dealers in a dealer network by a provider, administrator, coordinator, etc. of a dealer network) that allows dealers to see key performance indicators (e.g., presented according to competition zone labels assigned to zip codes or other geographic areas of interest to the dealer). A user associated with a dealer may thus access the interface at a vehicle data system such that the vehicle data system can identify the dealer (e.g., as a dealer of interest). An interface similar to that presented in FIG. 8 may then be presented to the user.

In particular, the interface may allow the dealer to enter a make of interest and based on the make of interest, depict the area of influence of the dealer on a map depicting geographic area (e.g., zip codes), coloring or shading the zip codes according to the competition zone labels determined for the dealer and make based on the CCZ or DCZ score determined for the dealer and make in the zip code. The interface may also present a table summarizing the dealer's performance by competition zone (e.g., in the example depicted, the table is presented at the left of the map) as well as a break down by zip code of the dealers (bottom of the dashboard). Interfaces of this type may thus effectively be utilized by dealers to understand the effects of distance and the density and distribution of competitors in its area of influence.

Figure 9:
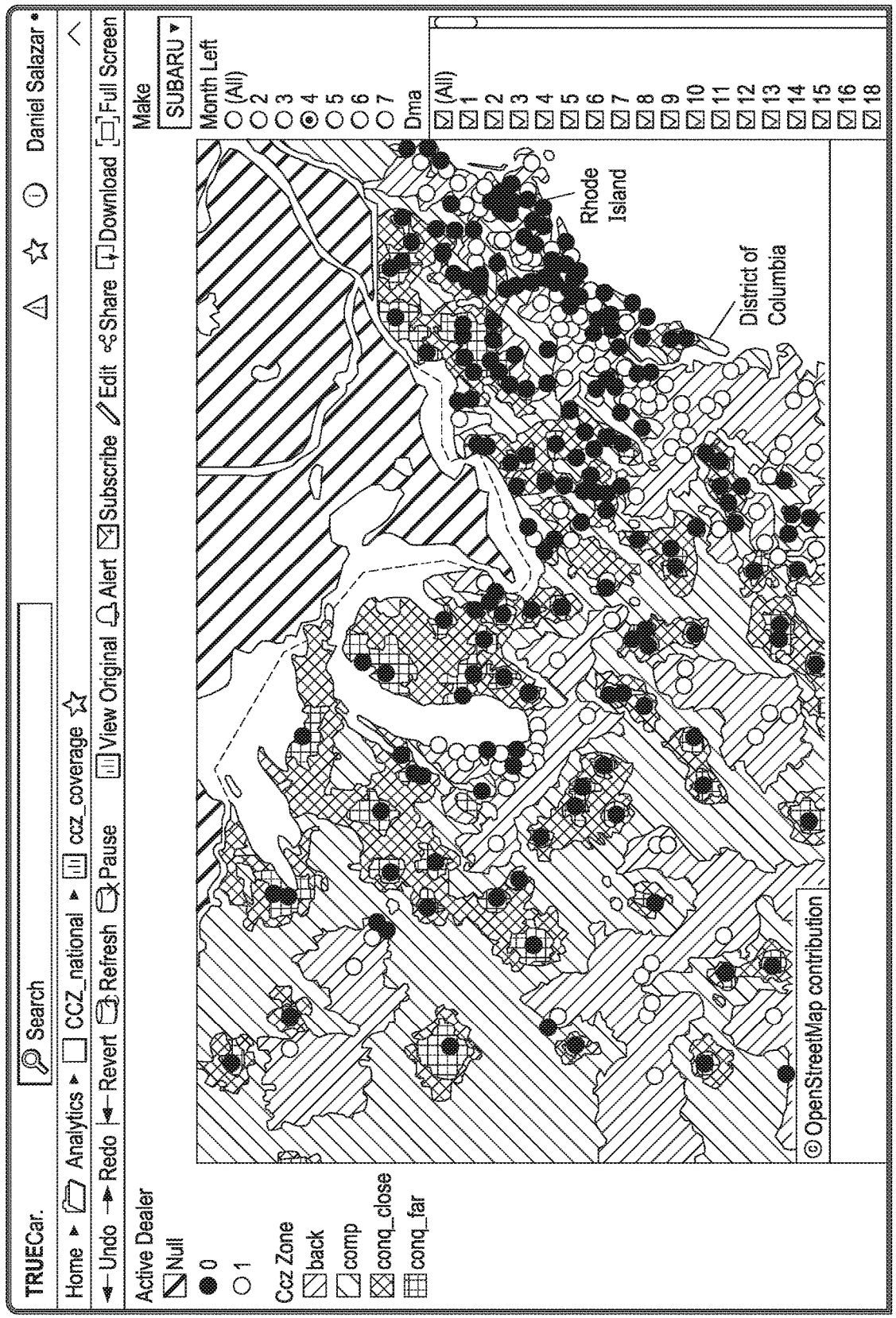

FIG. 9 presents one embodiment of a similar interface presented by a vehicle data system that applies the CCZ values to depict geographical coverage. The interface may allow a user to select the automaker (e.g., a "Make" drop-down window) and shows for each zip code a color coded or shaded version of the CCZ index value. A zip code colored in green (or shaded in a certain manner) may denote an area where at least one TrueCar dealer (e.g., a dealer who is a member of the TrueCar dealer network) is the closest available dealer for that make to that region; yellow areas (or shaded in a certain manner) may indicate a CCZ index between 0 and 1, corresponding to regions where no TrueCar dealer is the closest but getting to the closest TrueCar requires driving no more than twice the distance people in those areas usually drive to buy cars of the selected make. Finally, orange or red postal codes (or shaded in a certain manner) indicate zones with no TrueCar dealer is relatively close. By looking at the dashboard, users can quickly understand what areas have a convenient TrueCar dealer nearby. Also, this information can be matched against visitors to a web site (e.g., TrueCar.com) to quantify how many times a site visitor is in the vicinity of a TrueCar dealer, also known as 'backyard coverage'.

While certain embodiments of the use of the competition zones, DCZ and CCZ have been described as many other uses are contemplated herein. For example, competition zones may be usefully applied for dealer targeting. Specifically, in order to expand a network of certified dealers, a scheduled process may be used to evaluate the strategic worth of each dealer based on the individual sales and the network level sales that such dealer will bring to the dealer network. Competition zone derived algorithms may be used to assess individual level and network level sales respectively.

As another example, competition zones may be used to evaluate subscription rates. Dealers opting for the subscription fee model are assigned a fee that is proportional to the estimated monthly sales.

In still another example, competition zones may be used for dealer performance assessment. Traditionally, dealers assess their performance by looking at overall close rates in a certain amount of miles. By using zone labels instead of arbitrary radii better insights to dealers into the basic key performance indicators, like number of leads and conversion rate may be presented to dealers.

As yet another example, competition zones may be used for a dealer scorecard. Competition zone labels may be used to compare a dealer against its competitors. A dashboard can be presented by a vehicle data system that shows how many sales a competitor is obtaining from the dealer's backyard and vice-versa.

As one more example, CCZ values may be used to generate and present coverage maps (e.g., by zip code or make) for network dealers (e.g., a TrueCar coverage map). Similarly, the "value" of a dealer to a dealer network may be assessed (e.g., the impact of the dealer on the dealer network). Specifically, the impact assessment of dealers dropping of the dealer network may be determined.

As still one more example, a dealer selection algorithm may utilize the competition zone values. Such a dealer selection method may select what dealers to display or recommend to customers interacting with a vehicle data system based on the make and models and zip selected during the customer's search as well as the search zip code. For example, competition zone indices may be used to determine the search zip code any dealer is eligible to be displayed for.

It may now be useful to discuss particular uses of the competition zone values in more detail. In particular, in one embodiment, competition zone values may be used to predict sales for dealerships. One embodiment of these types of predictions is referred to as "sales and leads tree," or SALT.

A vehicle data system may utilize a SALT model to predict sales (e.g., prospective sales) for an individual dealer or dealers of a make based on the DCZ for that dealer and make, a dealer's market share and historical demand. SALT may be applied by a vehicle data system to generate a SALT model to predict induced sales for both dealers currently in a dealer network and dealers targeted to join the dealer network. In the latter case, the sales estimations provided by the vehicle data system using SALT may, for example, be used by owners or administrators of a dealer network to set subscription or membership rates for a dealer currently in, or to be added to, the dealer network. The sales predictions of SALT may also be used in dealer acquisition efforts to identify best performing dealers (e.g., in a network).

In describing an example embodiment of SALT the example network of the TrueCar dealer network will be utilized, however, it will be noted that embodiments of SALT may be applied to different dealer networks or sets of dealers, etc.

In one embodiment, given a specific dealer (hereafter dealer of interest), the list of data that may be used by a vehicle data system to generate or use a SALT model appears below. Based on these inputs, the SALT model may output the predicted monthly new car sales per dealer for TrueCar or non TrueCar dealers alike.

| Input Name | Source | Description |
| --- | --- | --- |
| Dealer Zip Code | Obtained or determined data stored at vehicle data system. | |
| Dealer Competition Zone Index (DCZ) values | Obtained or determined data stored at vehicle data system. For example, a DCZ table for dealers stored at vehicle data system using calculations described above | For that postal code and make, the DCZ value determined for the dealer. |
| Make or brand | | This refers to car brands. If a dealer represents multiple brands, a determination of a SALT value may be done for each make for the dealer |
| TrueCar dealer coverage in a 50 mile radius | Obtained or determined data stored at vehicle data system. | Number of TrueCar dealers in a 50 mile radius around the dealer of interest's zip code. |
| Monthly search visitors per make and zip code. | Obtained or determined data stored at vehicle data system. | Obtained from searches for make and zip code as received from users through the interface of the vehicle data system. |
| Industry sales data | Obtained or determined data stored at vehicle data system. | Refers to monthly sales for the dealer of interest as is determined from registration data for vehicle of specified make. This may, for example, by obtained from Polk. |
| Dealer of interest influence radius | Obtained or determined data stored at vehicle data system. | This may be selected by the dealer of interest, or determined by vehicle data system, as the acceptable area to show up for leads from the vehicle data system and stored with a dealer record at the vehicle data system. |

In one embodiment, to implement a SALT model, the vehicle data system may engage in a training or development phase and a prediction phase. During the training or development phase, the vehicle data system trains one or more models of the vehicle data system in order that the model can be used to make accurate predictions of one or more output variables, such as the number of monthly or quarterly sales by a dealer in a dealer network. In this phase, the models used by the vehicle data system may be trained using historical data for active dealers in a vehicle dealer network, such as TrueCar dealer network. Such historical data sets may include observed values for input variables and output variables. Recognizing that historical data may be noisy or outdated, embodiments may improve the quality of the training set by using historical sales data only from dealers which have been active for the preceding three-month period.

In the prediction phase, the vehicle data system, using a model trained during the training phase is able to forecast the value of the output variable (e.g., predicted sales) for any dealer, including dealers for whom the vehicle data system does not have any historical data.

According to embodiments, the vehicle data system may implement SALT to generate a SALT model to predict dealer sales utilizing three steps. Such a model may be stored at the vehicle data system (e.g., for example, as depicted in models 128 of FIG. 1).

First, feature generation for dealer-zip code pairs is performed. The dealer zip-code pairs may be limited, for a dealer, to those zip codes that are considered competition zones for that dealers. For a dealer that may include the number of expected leads. The number of expected leads may be obtained from historical data of the vehicle data system as a product of historical car brand searches received by the vehicle data system and historical conversion rate (e.g., of that dealer) for each zip code. Afterwards, for each zip code, the number of expected leads is multiplied by the expected close rate (the close rate may be determined using=the DCZ value of the zip code for the dealer and a curve of the type shown in FIG. 7B). This step yields an initial or simple sales prediction. Additional features such as dealer's market share and industry sales may also be generated using historical records as maintained by the vehicle data system.

The second step comprises aggregating the previous results from dealer-zip code up to dealer-competition zone. This way each dealer will have an initial estimation of sales for its backyard, competition and conquest zones.

Finally, the features generated and aggregated as described above are fed into any suitable ensemble learning model, such as a Random Forest model. The random forest model can then be used to predict the number of sales for each dealer and competition zone.

According to embodiments, feature generation may refer to the process of defining variables and values therefore to be fed into the random forest model in the third step. In one exemplary embodiment, the data inputs shown in the table above, either by themselves or in conjunction with historical data or data already stored by the vehicle data system, may be used to generate the features listed below:

| Feature | Description |
| --- | --- |
| Predicted Number of Leads | In one exemplary embodiment, the predicted number of leads may be determined by taking the number of unique search visitors for a given make (e.g., Alfa Romeo) for some historical time period (e.g., the most recent past quarter). This data may then be aggregated or segregated by competition zone or dealer make. These visitor statistics ("UVS") may then be multiplied by conversion rate values ("conv") for competition zone, vehicle make, and networked dealer density contained in, for example, a look-up table stored at the vehicle data system. The predicted number of leads for a dealership is thus: predicted_leads = uvs*conv. |
| Close Rate Prediction (model_prediction) | Predicted close rate ("predicted_close_rate") may be determined from the curves of DCZ/close rate as discussed herein above. |
| "Simple" or Initial Prediction | Sales According to some embodiments, a "Simple Sales Prediction" may be given by the following equation: predicted_leads * predicted_close_rate = uvs * predicted_conv * predicted_close_rate |

-continued

| Feature | Description |
| --- | --- |
| Dealer Market Share | According to some embodiments, this data may be provided by a third party data provider, such as Polk. |
| Dealer Industry Sales | According to some embodiments, this is the number of sales made by that dealer in the zip code or set of zip codes. In one embodiment this data may be obtained from a third party data source, such as Polk and stored at the vehicle data system. |
| Industry Sales | This feature refers to the total number of sales by all dealers of the same make for a given geographical area, such as zip code or set of zip codes. |
| CZ_zone | This feature refers to a mapping of competition zones (e.g., 'backyard', 'competition', 'conquest', "conquest far' or 'conquest near') by zip codes. |
| Number of Zip Codes in CZ_zone | This feature refers to the number of zip codes in the CZ_zone for the dealer (or the same CZ_zone for the dealer) as described above. |
| Dealer network within a 50 mile radius | This feature may refer to the number of active dealers of the make of interest in a 50 mile radius in the dealership network, along with the total number of active dealers of the make of interest in a 50 mile radius (including, for example, network and non-network dealerships). Alternatively, this can be expressed as a ratio of network dealers to non-network dealerships within a 50 mile radius of the dealer of interest. |
| Make tier | According to embodiments, this can refer to groupings of makes according to one or more analytically relevant criteria, mean and median close rate. |

According to some embodiments of implementing SALT at the vehicle data system, the conversion rate data may be segmented by features that affect conversion rate. Such segmentation may prove analytically beneficial, as conversion rates can vary dramatically according to local dealer coverage. In one embodiment, the segmented conversion rate data may be stored as entries of a look up table at the vehicle data system, such as in the example shown below:

| Make | CZ_Zone | Active_cat | Rank_dist | Conversion Rate |
| --- | --- | --- | --- | --- |
| Toyota | Backyard | 0 | 2 | 5.2% |

In the example above, the "CZ_Zone" segment may refer to the dealer's proximity to the competition, as discussed above. In this example, the conversion rate for a dealer in its "backyard" is given. In the non-limiting example above, "Active_cat" is a segment reflecting the density of active, in-network dealers of the same make within a specified geographical distance, typically 50 miles.

In this example, "Rank_dist" is a segment representing the rank of the distance (among active, in-network dealers) of the given dealer to the consumer zip code. In this example, the dealer has a "Rank_dist" value of "2", indicating that there is only one Toyota dealer closer to the consumer zip code. According to some embodiments, "Rank_dist" may be functionally different for active, in-network dealers than for prospective, out-of-dealer networks. According to some embodiments, "Rank_dist" may represent the dealer's rank of an active dealer's distance to the consumer zip code among active dealers, and for prospective dealers "Rank_dist" may represent the dealer's rank of distance assuming that they are added to the dealer network.

Having determined features, embodiments of the vehicle data system implementing SALT may aggregate the determined features from dealer-zip code level up to dealer-competition zone. This way, an initial estimation of sales for its backyard, competition and conquest zones may be determined for each dealer.

According to some embodiments, this aggregation may also involve a first estimation of leads and sales for each zip code in each of the dealer's backyard, competition, and conquest zones. For example, predictions of the dealer's leads and sales for each zip code of the backyard, competition and conquest zones may be denoted as "pred_leads_z" and "pred_sales_z," as shown below:

$$\text{pred leads } z = SV_z * \text{ConversionRate}(z)$$

$$\text{pred sales } z = \text{pred leads } z * \text{CloseRate}(z)$$

Where ConversionRate(z) and CloseRate(z) are read from the lookup tables determined in the first step as discussed above.

In a third step, embodiments of the vehicle data system implementing SALT may feed the determined features into a random forest model to determine the value of an output variable, such as a dealer's predicted monthly sales, based on the determined features as inputs. This step may be performed at least twice, first during a training phase in which the values of both the input and output variables are known, and again in a prediction phase, during which values of input variables are provided to a trained model.

Figure 10:
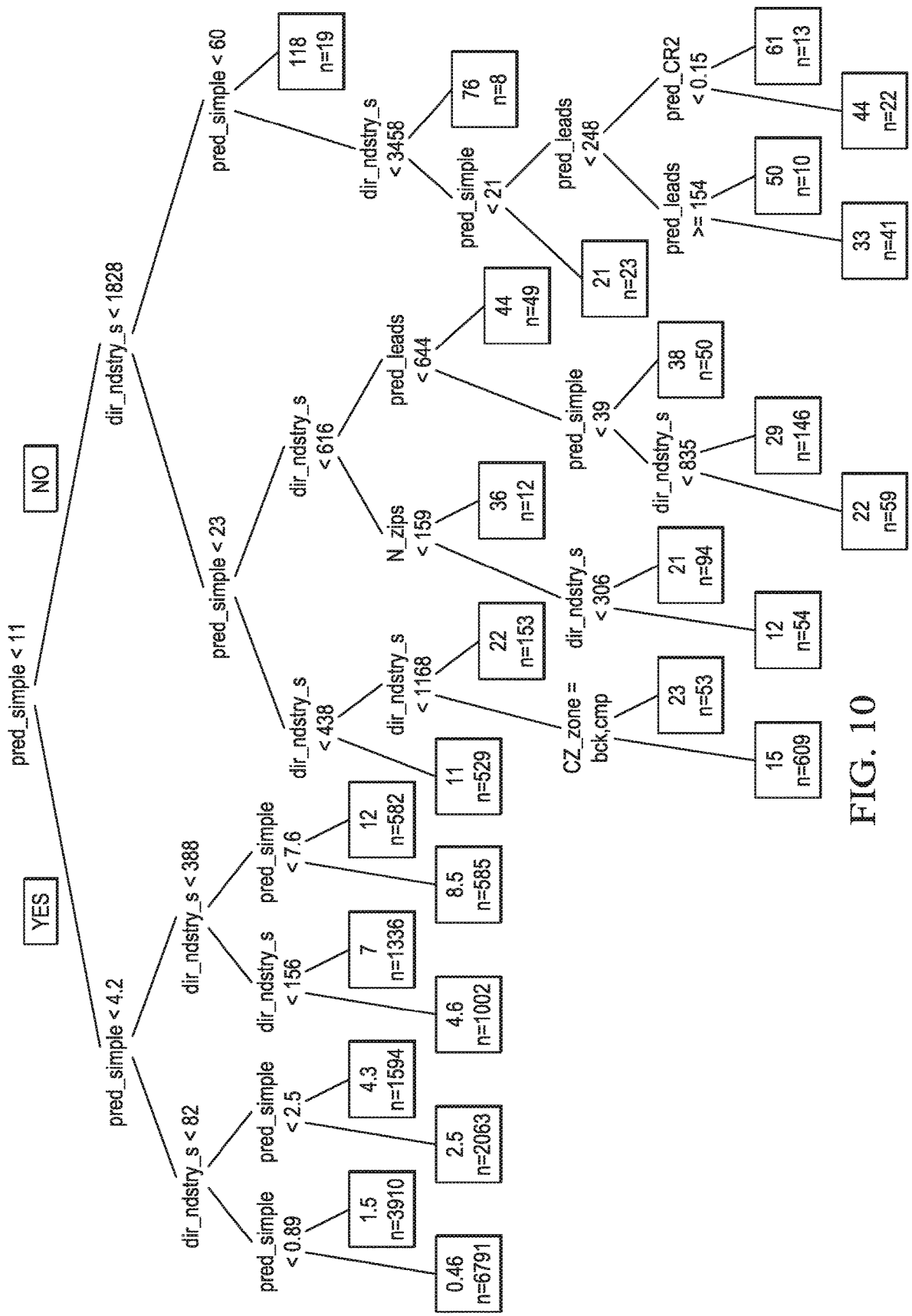
FIG. 10 is a diagram depicting one embodiment of a random forest model for a SALT model.

According to some embodiments, the vehicle data system may train a random forest model using a training set of around three month's data for a set of active dealerships. A depiction of such a random forest model is presented in FIG. 10.

Using the SALT model then, embodiments of a vehicle data system may be used to determine the value of an output variable such as predicted sales for a dealer. Moreover, similar SALT models may be used to predict the sales of used cars for used car dealers. It should be noted that, from an analytical perspective, the used car market may differ significantly from the new car market in at least the following regards: the quality of vehicles within a given make may vary significantly across dealerships; the correlation between industry used car sales volume and used sales for dealers in a geographic area is comparatively weaker for used car sales; and the concept of "make" is less applicable in the context of used car sales, as used car dealers may sell a variety of makes, whereas new car dealers typically only carry one or a view makes.

According to some embodiments, a vehicle data system may build a used car sales model for SALT on top of the SALT new car sales model and designed as a linear function of new sales. The used car sales model may a linear function of predicted new sales for a dealer, as shown below:

$$USED\ SALES = c + (m(state) + m(make, Polk\_quartile)) * New\ Sales$$

Or $$USED\ SALES = c + m(state, make, Polk\_quartile) * New\ Sales$$

In the example of a used car predicted sales model shown above, the model is built from two multipliers, one at a state level and one at a make, Polk quartile level. A Polk quartile may be defined as a quartile of used car to new car sale ratio to which a dealer belongs. For each dealer, new car sales and used car sales may be extracted from historical sales records (e.g., as obtained from a third-party data source such as Polk). For each dealer, the ratio between its sales of used cars and sales of new cars may be computed. These used car and new car sales may be for sales occurring in the dealer network (e.g., the TrueCar dealer network).

Then, for each make, the dealers may be bucketed into four quartiles according to their used to new sales ratios. In this embodiment, a state level multiplier, (e.g., m(state)) may be computed as the average ratio for each state (e.g., geographic region) of used sales to new sales for dealers within a dealership network in that state, such as TrueCar. Additionally, the make, Polk quartile multiplier (e.g., m(make, Polk quartile)), may be computed by taking, for each make and Polk quartile, the average ratio of used car sales within a dealership network to new car sales within the dealership network.

In one embodiment, the equation for determining used car sales for a dealer based on a prediction of the new car sales for that dealer may be as follows:

$$USED\ SALES = 1.7 + 0.31(m(state) + m(make, Polk\_quartile)) * New\ Sales.$$

As another example of a use of the competition zone values, a Zip code based Expected Universal Sales (ZEUS) method predicts network level sales (e.g., as contrasted with dealer level sales predicted by SALT described above). In other words, ZEUS models as employed by the vehicle data system may assist in the vehicle data system predicting an increase (or decrease) in sales for a dealer network as a whole that may result from the addition (or removal) of a particular dealer or set of dealers from the dealer network. To account for network effects, ZEUS uses may utilize CCZ values for a dealer.

In describing an example embodiment of ZEUS and ZEUS models that may be utilized by embodiments of the vehicle data system, the example network of the TrueCar dealer network will be utilized, however, it will be noted that embodiments of ZEUS may be applied to different dealer networks or sets of dealers, etc.

In one embodiment, given a specific network, the list of inputs to ZEUS model appears below:

| Input | Description |
|---|---|
| Dealer Competition Zone values | This may be stored as determined data at a vehicle data system. |
| Mapping from CCZ to close rate. | Close rate may, according to some embodiments, be modelled based on CCZ, as discussed above, or some combination of DCZ and CCZ. |
| Current number of prospects and visitors by zip code. | In some embodiments, this may be obtained from data stored at a vehicle data system. |

Based on these inputs, ZEUS outputs the expected sales at the network level induced by each dealer. For example, in certain embodiments, this may be accomplished by determining a predicted number of sales for the dealer network without a dealer. A hypothetical prospective network including the dealer of interest may be created and the predicted number of sales for this hypothetical prospective network can be determined. The difference between the predicted number of sales for each dealer network may be the expected "lift" or additional sales that are predicted to occur if the dealer is added to the dealer network. For the TrueCar dealer network, the inputs to the ZEUS model may be a list of TrueCar dealers of some specified make, a list of non TrueCar dealers of the same make as above and a count of historical prospects by make and zip code.

In the context of certain embodiments, a "sale" refers to the purchase of a vehicle at a dealership (e.g., at a dealer that may, or may not by, in a dealer network, such as the TrueCar network). Further, according to embodiments, a "sale" or "close" results a sale that results from an introduction or lead generated at a search site or other interface of the dealer network provided by the vehicle data system. In other words, when a user interacts with the vehicle data system the user may search for a particular make or model in a particular geographic region. In the context of certain embodiments, a "prospect" refers to an instance in which a search visitor of a site of the vehicle network submits information associated with any given make in any given zip code. Similarly, a "conversion" occurs when a user becomes a "prospect". This user's data may be provided to one or more dealers (e.g., of a dealer network affiliated with the vehicle data system) as a "lead", or a single user being introduced to any number of dealers. If that user ends up purchasing from one of those dealers, that information may be obtained by the vehicle data system, and the dealer credited with a close (that may be tied to a "prospect" or "lead" associated with the user.

In some embodiments, if the same person submits multiple leads for the same make (i.e., leads for different models of the same make within the same time period, and in the same zip) the individual is counted only once against the demand for that make in the zip. However, according to some embodiments, if the same user submits leads for different makes in the same search zip or submits leads for different search zips irrespective of the makes, each of the leads submitted by the user may be treated as different prospects due to the different combinations of makes and zips.

The vehicle data system may implement a ZEUS model as follows. First, the current network CCZ may be calculated. In particular, an initial snapshot of the dealer network (such as the TrueCar network) may be taken and a CCZ determined for the dealer network (e.g., for all dealers of a set of dealers in the network). Next, close rate by zip code can be determined based on the determined CCZ. As discussed, CCZ may be related to close rate, thus the CCZ value for a dealer may be used to determine that dealer's close rate. Then, a hypothetical prospective network (e.g., candidate or potential new network) can be generated by adding a dealer from the list of non-network (e.g., non TrueCar) dealers to the list of network dealers and repeat the calculation of CCZ and close rate for the potential new network. Then, network lift sales can be determined by, for each zip code, calculating the difference in close rate between the current and the potential networks and multiplying by expected prospects.

It will be noted that close rate can be modeled as a function of CCZ or DCZ. For example, FIG. 7B is a graph depicting close rate modeled as a function of DCZ. However, in some embodiments, it may be desirable to determine close rate as a function of CCZ. In such embodiments, the initial data set may exhibit a high degree of noise which may need to be accounted for in developing a CCZ-close rate curve. In certain embodiments, to reduce noise in the data set and smooth out the observations, it may be desirable to first bin the received close rate data into groups of the same size base on CCZ. Such binning may reduce the number of data points and reveal a curve that exhibits the typical shape of the close rate-competition zone index relationships.

Additionally, according to embodiments, close rate curves may be generated for each make sold by each dealer network for which the vehicle data system is utilizing the ZEUS model. However, for some makes, there may be too few data points to generate a statistically sufficient, smoothed sample, which may be desired for certain implementations of a ZEUS model. This problem may be avoided by grouping OEM's in brackets according to the positions of the median and mean close rates.

In one embodiment, this may result in a first tier comprising makes that may have high close rates in certain markets. In some markets, the makes belonging to the top tier, according to median and mean close rates may include Honda, Toyota and Subaru. In some markets, the next tier may include marks such as Audi, BMW, Chevrolet and Volkswagen. In some markets, the third tier may comprise makes such as Acura, Alfa Romeo, Maserati, and Volvo. The final tier, may in some markets, comprise makes such as Bentley, Ferrari, Lamborghini and Rolls-Royce.

After grouping by close rate tier, in some embodiments, a monotonically decreasing regression function may be applied to the grouped data to generate one or more CCZ/close rate curves. Use of a monotonically decreasing function may be desirable in that such a function ensures that close rate declines as CCZ increases. Such a monotonic regression may be performed using known software tools, such as the sci-kit learn library for Python.

The determined close rate for the prospective network may then be multiplied by the number of unique predicted prospects for each zip code covered by the prospective network. In some embodiments, unique predicted prospects correspond to unique prospects by make and zip code.

Predicted prospects may be determined according to at least two different models—a simple model and a multivariate model. In some embodiments, the simple model may operate by considering historical prospect data and projecting it into the future. One approach for generating a simple model for predicted prospects is to look at the prospect data for a given make and zip code for the immediate past (e.g., the past one to three months) and take the average number of leads. In some cases, this approach may yield more accurate results than looking over a longer historical period (such as the previous year) and taking the median number of prospects per make per zip.

Alternatively, it may be possible, in some embodiments, to determine predicted prospects using one or more multivariate models. The features of such multivariate models may include historical prospects of a given make in a given zip code, data regarding historical visits to a network site provided by the vehicle data system (such as TrueCar.com), conversion rate data (by make and state), and demographic data (e.g., as obtained or determined and stored at the vehicle data system). Demographic data may include, for example, median or mean household income for a given zip code and may affect the number of predicted prospects for a given make. For example, the number of prospects per zip code decreases with income. Other demographic factors may also influence the number of prospects per zip code.

Model coefficients for these features may be determined by any appropriate means, including linear regression or random forest model. Depending on make and relevant market, different models may predict coefficients for the features more accurately. For example, after generating coefficients for the features discussed above, validation testing of models for predicted prospects developed using linear regression and random forest, showed that for some makes, such as Acura, BMW and Honda, using a random forest approach resulted in models that predicted unique prospects by zip code more accurately than models developed using linear regression to weight features. However, for other marks, such as Chrysler, Infiniti and Mini, the opposite held true.

It will further be noted that a ZEUS model may also be implemented to model the effect on close rate, and network sales attributable to removing a dealership from a network. In such embodiments, an initial snapshot of the dealer network may be taken and CCZ for the dealers of the network determined. Next, a candidate or potential new network can be generated by removing a dealer from the list of network dealers and repeating the calculation of CCZ and close rate for the potential or prospective new network (e.g., without the dealer of interest). The drop in network sales may once again be determined by, for each zip code, calculating the difference in close rate between the current and potential networks and multiplying by expected prospects.

According to embodiments, the prediction of sales for a given active network for a given period of time using a ZEUS model may be expressed as:

$$\text{Sales}(D, t, m, Z) = \sum_{\forall zip \in Z} \widehat{Prospects}(zip, m, t) * \widehat{Close\ rate}(zip, m, t)$$

In some embodiments, including those of the example above, Sales(D,t,m,Z) may denote predicted sales for make m in time period t by the set of TrueCar dealers D in region Z; whereas Z represents the set of ZIP code regions under consideration. The two functions $\widehat{Prospects}$ (zip,m,t) and $\widehat{Close\ rate}$ (zip,m,t) denote respectively the predicted number of prospects and the close rate of the dealer set D for a particular region zip and make m in time period t.

The estimation of prospects may be performed using the $\widehat{Prospects}$ (zip,m,t) function as a combination of historical prospect counts and historical search visitors for zip,m; national and regional observed conversion rates as well as demographic information for zip. All these elements can be combined in a multivariate regression.

In some embodiments, the $\widehat{Close\ rate}$ (zip,m,t) function estimates the close rate for zip code m based on its CCZ index value, which may be a function of the dealer set D. Thus, if D changes through addition or subtraction of dealers to the network, CCZ may change for one or more zip codes.

However, the $\overline{CloseRate}$(zip,m,t) function may, in certain embodiments, incorporate an isotonic regression model that relates close rate with CCZ.

Leveraging the predicted number of prospects and close rate, the ZEUS model can be applied to estimate sales over any region and for any instance of the dealer set. Moreover, ZEUS allows the estimation of differential sales for two instances of the dealer set D and D' by simply calculating the difference Sales(D',t,m,Z)−Sales(D,t,m,Z). For example, ZEUS may be used to determine lift sales brought by the addition of one single dealer to the network. In such a case D is the set of incumbent dealers and D' the set of dealers after the introduction of a prospective dealer, ceteris paribus. Conversely, the effect of removing dealers from D can be similarly determined.

In this regard, embodiments of ZEUS can provide an indication of a dealer's value to a dealership network and may provide inputs for systems and methods for optimizing the membership of a dealer network.

While certain embodiments of the use of the competition zones, DCZ and CCZ have been described as many other uses are contemplated herein. For example, competition zones may be usefully applied for dealer targeting. Specifically, in order to expand a network of certified dealers, a scheduled process may be used to evaluate the strategic worth of each dealer based on the individual sales and the network level sales that such dealer will bring to the dealer network. Competition zone derived algorithms SALT and ZEUS as described may be used to assess individual level and network level sales respectively.

As another example, competition zones may be used to evaluate subscription rates. Dealers opting for the subscription fee model are assigned a fee that is proportional to the estimated monthly sales. Such estimation may be made using SALT.

In still another example, competition zones may be used for dealer performance assessment. Traditionally dealers assess their performance by looking at overall close rate in certain number of miles. By using CZ labels instead of arbitrary radii better insights to dealers into the basic key performance indicators, like number of leads and conversion rate may be presented to dealers.

As yet another example, competition zones may be used for a dealer scorecard. Competition zone labels may be used to compare a dealer against its competitors. A dashboard can be presented by a vehicle data system that shows how many sales a competitor is obtaining from the dealer's backyard and vice-versa.

As one more example, CCZ values may be used to generate and present coverage maps (e.g., by zip code or make) for network dealers (e.g., a TrueCar coverage map). Similarly, the "value" of a dealer to a dealer network may be assessed (e.g., the impact of the dealer on the dealer network). Specifically, the impact assessment of dealers dropping of the dealer network may be done with a modified version of ZEUS.

As one more example, a dealer selection algorithm may utilize the competition zone values. Such a dealer selection method may select what dealers to display or recommend to customers interacting with a vehicle data system based on the make and models and zip selected during the customer's search as well as the search zip code. For example, competition zone indices may be used to determine the search zip code for which a dealer is eligible to be displayed to a user when the user makes a search for a make associated with that dealer and a particular zip code.

Figure 11:
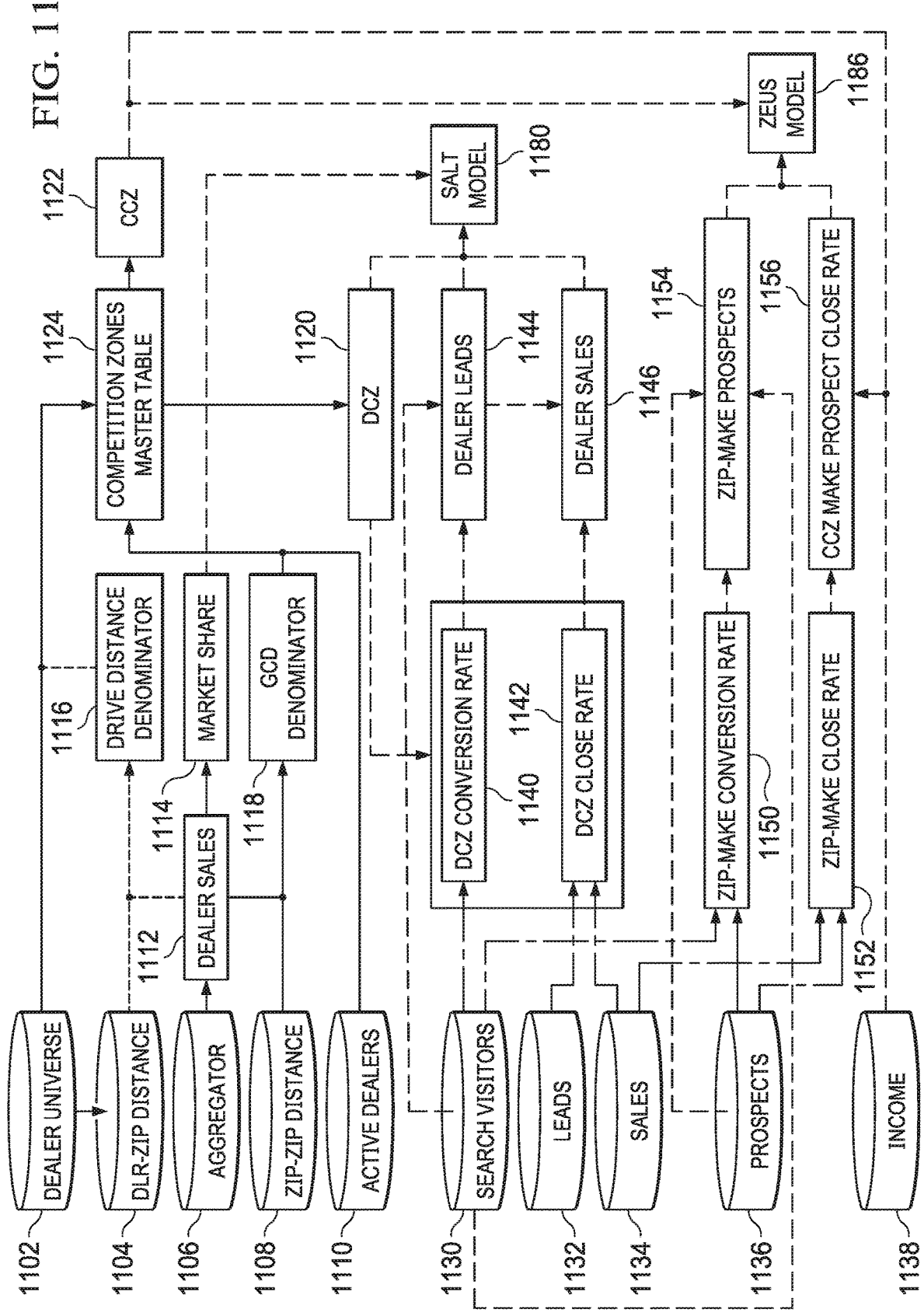
FIG. 11 is a diagram showing data and data flows for one embodiment of the implementation and use of SALT and ZEUS models.

Turning now to FIG. 11, an overview of an embodiment of a flow 1100 of initial and determined data and associated evaluation and rules generation for SALT and ZEUS models performed by a vehicle data system is provided. As shown in FIG. 11, data (including determined or obtained data stored at a vehicle data system) is represented on left hand side, with determined inputs (e.g., CCZ and DCZ) and resulting models (e.g., SALT model 1180, ZEUS model 1186) shown on the right. It will be appreciated that such data may be stored in lookup tables or other memory structures or may be further segmented as appropriate to speed the processing or reduce the memory usage of embodiments as disclosed.

According to one embodiment, determine or obtained data 1102, 1104, 1106, 118, 1110 may be used in the determination of DCZ values 1120 and CCZ 1122 values for a set of dealers. These dealers may be dealers within, or external to, a dealer network (such as the TrueCar dealer network).

Specifically, these inputs include obtained data regarding dealer universe 1102, which may comprise available information regarding all of the dealers in a geographic location (such as nationally or statewide). This data may include GPS coordinates or other specification for each dealer's geographic location and which, if any, dealer networks each dealer belongs to. The initial inputs may also include DLR-ZIP distance data 1104. DLR-ZIP distance data 1104 may comprise, for some or all of the dealers listed in dealer universe data 1102, the computed distance between the GPS coordinates of each dealer and the centroid (e.g., expressed in longitude and latitude) of each zip code within a specified radius of the dealer. For large zip codes, DLR-ZIP distance data 1104 may be a more accurate indicator of the distances driven by customers than a straight zip code to zip code distance determination.

Data that may be used in the determination of CCZ 1122 and DCZ 1120 values for dealers (or other determination by vehicle data system) may also include data 1106 obtained from a data source or data aggregator of vehicle sales data such as Polk, an aggregator of historical sales transaction data which can associate vehicle models, dealer addresses and customer zip codes for vehicle sales. Additionally, obtained data at the vehicle data system may include ZIP-ZIP distance values 1108, which like DLR-ZIP distance values 1104, are an indicator of the distances customers may drive to a particular dealer. According to some embodiments, ZIP-ZIP 1108 may be calculated by determining the distance between the GPS coordinates of the centroid of a dealer's zip code and the GPS coordinates of the centroid of the customer's zip code.

Additionally, data at the vehicle data system may (e.g., that may be used for determination of CCZ 1122 and DCZ 1120 values) may include active dealer information 1110. Active dealer information 1110 may comprise, for example, an identification of which dealerships are members of a user network, such as the TrueCar network, as well as the duration of their membership and sales or inventory data for network dealerships, along with other data, such as, for example, the area or radius from which a dealer may wish to receive leads.

Attention is now directed to data 1112, 1114, 1116, 1118, 1120, 1122, 1124 stored at vehicle data system that may be obtained, or determined, based upon obtained data 1102, 1104, 1106, 1108, 1110. According to embodiments, such data 1112, 1114, 1116, 1118, 1120, 1124 may include dealer sales data 1112, which may be determined from aggregator data 1106. Dealer sales data 1112 may comprise data showing, for each dealer, the aggregate sales for a given vehicle make in the dealer's zip code, as well as the dealer's sales for the make across customer zip codes. From dealer sales data 1112, market share data 1114 may be determined (which may an input to determine SALT model 1180 as described herein). According to embodiments, market share data 1114 may show, for each dealer in a given zip code, what fraction of the sales of a particular make (in that zip code or zone, or across another geographic region) were realized by that dealer. Market share data 1114 may also show, for each dealer, what fraction of sales of a particular make were realized by the dealer in other zip codes (e.g., or other zones or geographic regions).

Determined data at the vehicle data system may also include drive distance denominator 1116. According to embodiments, drive distance denominator 1116 may refer to the median distance driven by customers in a particular zip code to buy a particular make, where the median distance is determined based on calculated routes within the zip code of interest. Additionally, data determined by the vehicle data system may include Great Circle Distance (GCD) denominator 1118, which according to embodiments, may reflect the median distance between customers and dealerships of a given make, as determined based on a great circle distance calculation (e.g., a direct distance, sometimes colloquially referred to "as the crow flies"). Depending on the context, GCD denominator 1118 may be preferable to drive distance denominator 1116, as it does not require the involvement of a routing system and may present less computational overhead.

Further determined data may include competition zones master table 1124. Competition zone master table 1124 may comprise a table that stores all of the data required to compute both DCZ values 1120 and CCZ values 1122 for dealers. It will be noted that competition zone master table 1124 may be a temporary table determined and constructed by the vehicle data system at the time of determination of DCZ values 1120 or CCZ values 1122 to improve computational or processing efficiency, to reduce database access times or reduce memory or database usage.

As these DCZ values 1120 or CCZ values 1122 may be determined at certain intervals, competition zone master table 1124 may be determined at these intervals and discarded, freed, decommissioned, etc. after the determination of the DCZ values 1120 or CCZ values 1122 is made. The data in competition zones master table 1124 may include, for one or more given dealers, all of the DLR-ZIP, ZIP-ZIP, distance denominator data, distances to other dealers, and typical distances for customers in a particular zip code to buy a particular make.

Thus, determined or obtained data 1102, 1104, 1106, 118, 1110, 1112, 1114, 1116, 1118, 1124 may be used in the determination of DCZ values 1120 and CCZ values 1122 stored in a table for a set of dealers as discussed herein. Some of this determined or obtained data 1102, 1104, 1106, 118, 1110, 1112, 1114, 1116, 1118, 1120, 1122, 1124 may be used in association with other determined or obtained data at the vehicle data system in the determination of SALT model 1180 or ZEUS model 1186.

Specifically, additional obtained or determined data at the vehicle data system that may be used in the determination of SALT model 1180 or ZEUS model 1186 may include data regarding search visitors 1130. Search visitor data 1130 may refer to data maintained by the vehicle data system regarding interaction with an interface (such as a web page or the like). Such data may include, for example, data regarding the number of search (e.g., monthly) visitors to the web site conducted. This data may be kept per make and zip code.

Lead data 1132 may also be obtained or determined by a vehicle data system. In many cases, the vehicle system may provide data regarding a visitor to the interface (e.g., web page or the like) to a dealer. Such lead data 1132 may include data regarding instances in which a search visitor is, following a search for a particular car through the interface, connected (e.g., the dealer provided with the visitor's information or the visitor provided with a dealer's information, etc.) with a dealership (e.g., which may be a dealer within a dealer network (such as the TrueCar network)) offering the searched-for car.

Additional obtained or determined data at the vehicle data system may include sales data 1134 regarding the purchase of a vehicle at a dealer that is a certified member of the relevant dealer network (such as the TrueCar network), provided the transaction is the result of an introduction or lead generated by or within that dealer network (e.g., a lead generated from the vehicle data system based on a visitor to an interface). Further, additional obtained or determined data may include prospect data 1136, which, in embodiments, may refer to data relating to instances in which an individual submits data associated with one or more leads of any given make in any given zip code. Additional obtained or determined may also include income data 1138, which may comprise data regarding, for example, the median income for specified zip codes.

Certain data 1140, 1142, 1144, 1146 that may be determined by the vehicle data system and used in the determination of SALT model 1180 will now be discussed. Determined data may include DCZ conversion rate data 1140, which may comprise lookup tables or other data structures associating, for a given geographic area, the curve between DCZ values and conversion rate (e.g., leads generated/search visitors). As discussed herein, conversion rate typically decreases with increasing DCZ, in accordance with the intuition and data showing that dealers tend to perform best in their "backyard" zone.

Additionally, determined data at the vehicle data system may also include DCZ close rate data 1142, which likewise may comprise lookup tables or other data structures associating, for a given geographic area, the curve between DCZ value and close rate. As discussed herein, close rate, like conversion rate, typically decreases with increased DCZ, in accordance with the intuition and data showing that dealers are more likely to conclude sales with customers in their own "backyard" zone.

Determined data at the vehicle data system may also include dealer lead data 1144, which, in embodiments, may comprise current and historical data regarding the number of leads submitted to each of a set of dealers (where the set may be all dealers, dealers in or outside of a dealer network or geographic area or zone, etc.). Dealer sales data 1146 includes data reflecting the number of sales of each dealer of a set of dealers or reflecting the number of sales of a set of dealers. For example, dealer sales data 1146 may include data on sales resulting from a submitted lead, or otherwise attributable to a dealer network.

Thus, determined or obtained data 1114, 1130, 1132, 1134, 1140, 1142, 1144, 1146 may be utilized along with the DCZ values 1120 by the vehicle data system in the determination of SALT model 1180 as described herein.

Data regarding search visitors 1130 and sales data 1134 may also be utilized along with prospect data 1136 and CCZ values 1122 by the vehicle data system in the determination of ZEUS model 1186. In particular, this data may be utilized by vehicle data system to determine data 1150, 1152, 1154, 1156 for use in determining the ZEUS model 1186. This determined data may include conversion rate data 1150 (e.g., for a set of dealers) that may be aggregated at by zip code and make. Additionally, close rate data 1152 (for a set of dealers) may also be determined by the vehicle data system (e.g., this data may again be aggregated by the zip code and make).

Still further, data determined by the vehicle data system may include prospect data 1154 (e.g., which may be aggregated by zip code and make). Prospect close rate data 1156 may be determined at the at the CCZ-make level. As discussed herein, this data may be generated using either a simple model, or a multivariate model, which may consider additional data, including demographic data such as income data 1138.

It may now be useful to illustrate how features determined for a dealer, including features based on a SALT model or ZEUS model for a dealer or network of dealers may be presented through an interface by a vehicle data system. Embodiments of these types of interfaces may be presented as a portion of one or more tools that are offered to vehicle dealers (e.g., to dealers in a dealer network by a provider, administrator, coordinator, etc. of a dealer network) that allows dealers to see key performance indicators (e.g., presented according to competition zone lables assigned to zip codes or other geographic areas of interest to the dealer).

Some of these interfaces may also be presented as a portion of one or more tools or interfaces offered to users of vehicle data system that are affiliated with owners or operators of vehicle data system and may be used by these users (or owners or operators of the vehicle data system) to determine which dealers to target as candidates for addition to a dealer network (or as candidates to remove from a dealer network). A user associated may thus access the interface or tool at a vehicle data system such that the vehicle data system can identify a dealer (e.g., as a dealer of interest) or dealer network and present the user with an appropriate interface.

In one embodiment, for example, a vehicle data system may generate a graphical display in an interface presented to a user (such as a dealer, or a user associated with an operator or owner of a vehicle data system) to present information on predicted sales for a particular dealer for a certain make using a SALT model. Such a presentation may include, for example, a breakdown for a dealer by competition zones informing the user of the predicted number of leads for the dealer, along with a predicted number of sales and the number of zip codes included having that competition zone label for that dealer. FIG. 12 depicts one embodiment of such an interface.

As an example of other embodiments, a vehicle data system may generate a graphical display in an interface presented to a user (such as a dealer or a user associated with an operator or owner of a vehicle data system) to present information on the effect of adding (or removing) a dealer from a dealer network as determined using a ZEUS model. Such a presentation may include, for example, a depiction of a zip code map and a coded presentation of the zone labels along with graphical depiction of the various information associated with the geographic region. Graphical depictions may also be used in the interface to depict other features for the dealer (or other dealers), such as coded depictions of close rate or relative performance, etc. Features associated with the dealer, including textual display of data associated with the determination of the DCZ values, CCZ values, zone labels or other data may also be presented in the interface.

Figure 13:
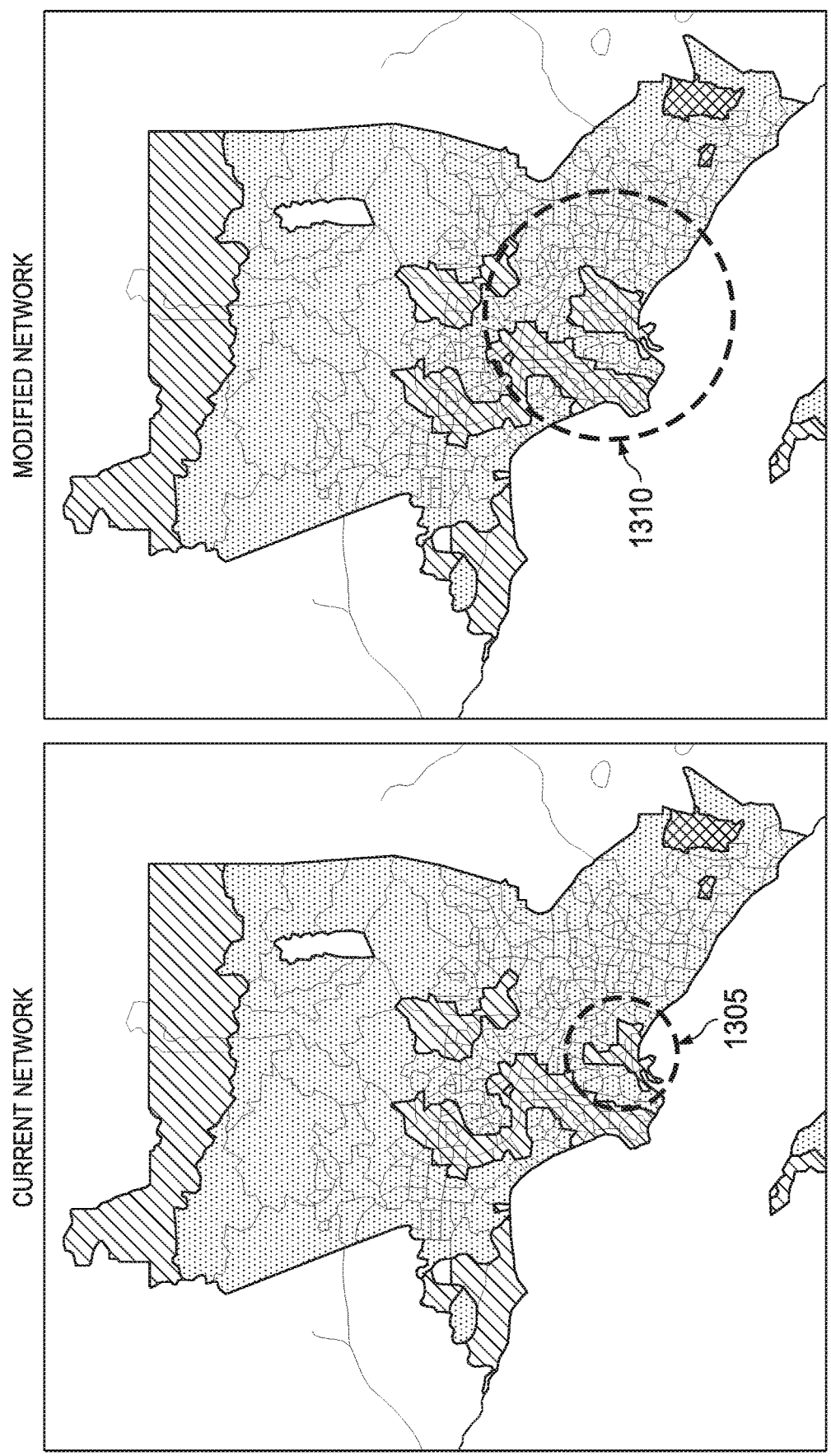
FIGS. 13-16 are depictions of embodiments of interfaces used by a vehicle data system for presenting the results of the application of a ZEUS model for a dealer or network of dealers.

For example, FIG. 13 depicts an example of an interface which provides visualizations of a vehicle data system's application of a ZEUS model to a dealer network. Here, for example, the "Current Network" label in the presented interface depicts the determined values of CCZ for a given dealer network across zip codes in the Los Angeles area. Note the small "L" shaped region 1305 in the "Current Network" portion of the interface shaded identically to indicate the contours of a set of zip codes having an equivalent CCZ value. The "Modified Network" portion of the interface depicts the recalculated values of CCZ for the dealer network of the "Current Network" using the ZEUS model of the vehicle data system when modified through the addition of a dealer. As shown by area 1310, the small "L" shaped region of zip codes of equivalent CCZ value has expanded into a much larger, squarer region.

Figure 14:
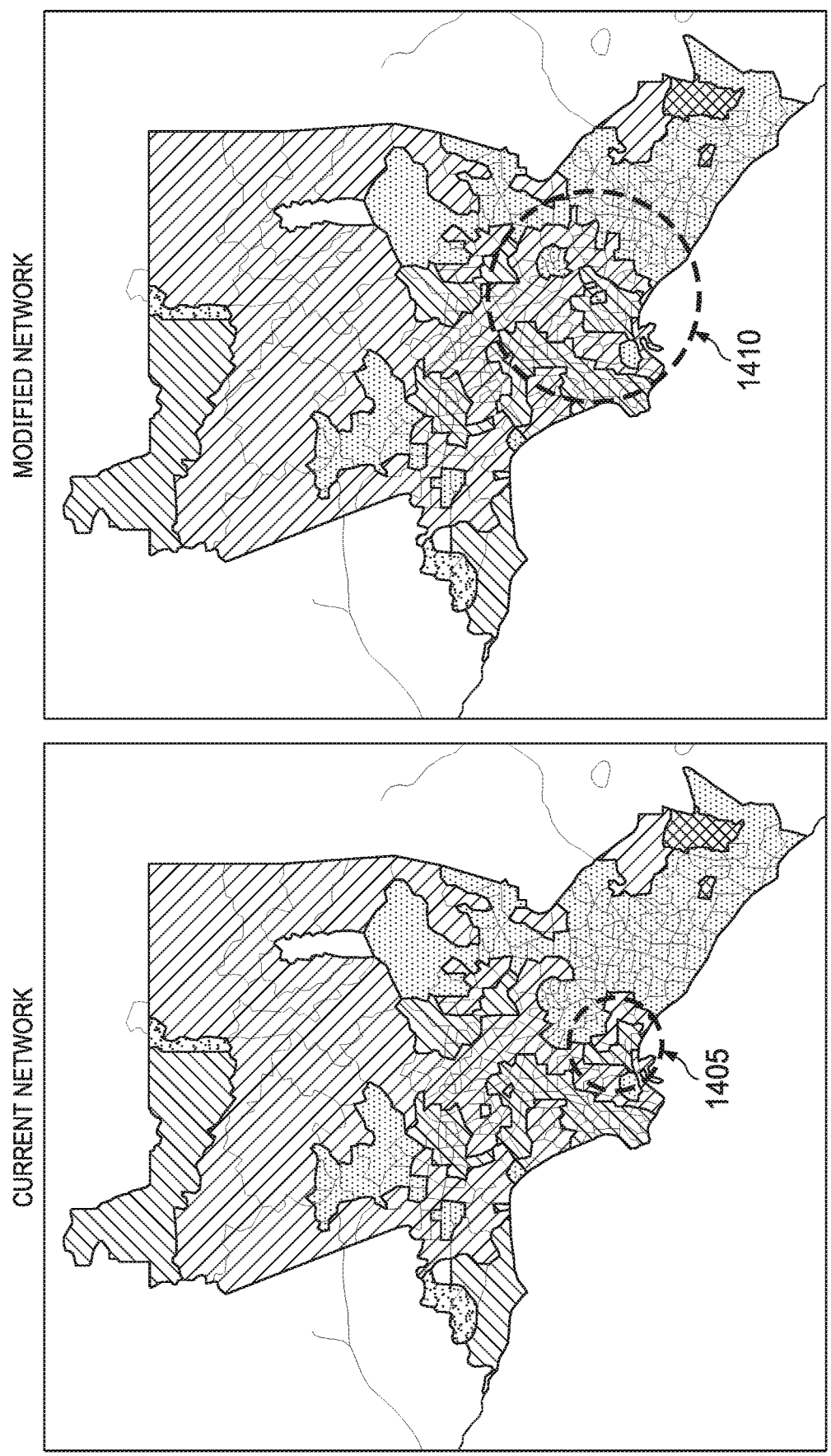

FIG. 14 provides an example of an interface which provides visualizations of a vehicle data system's application of a ZEUS model to a dealer network to determine that change in close rate for a dealer network based on the addition of a dealer. Here, the "Current Network" shows the determined close rate values for a dealer network across zip codes in the Los Angeles area. Again, note the small dark "L" shaped region 1405 in the "Current Network" showing zip codes having analogous close rates under in the current dealer network. The "Modified Network" portion of the interface shows the close rate values recalculated according to the ZEUS model after the dealer network has been modified through the addition of one dealer. Once again, note the expansion of the "L" shaped initial area 1405 into a larger, squarer region 1410 showing the "lift" in close rate attributable to the addition of the dealer to the network.

Figure 15:
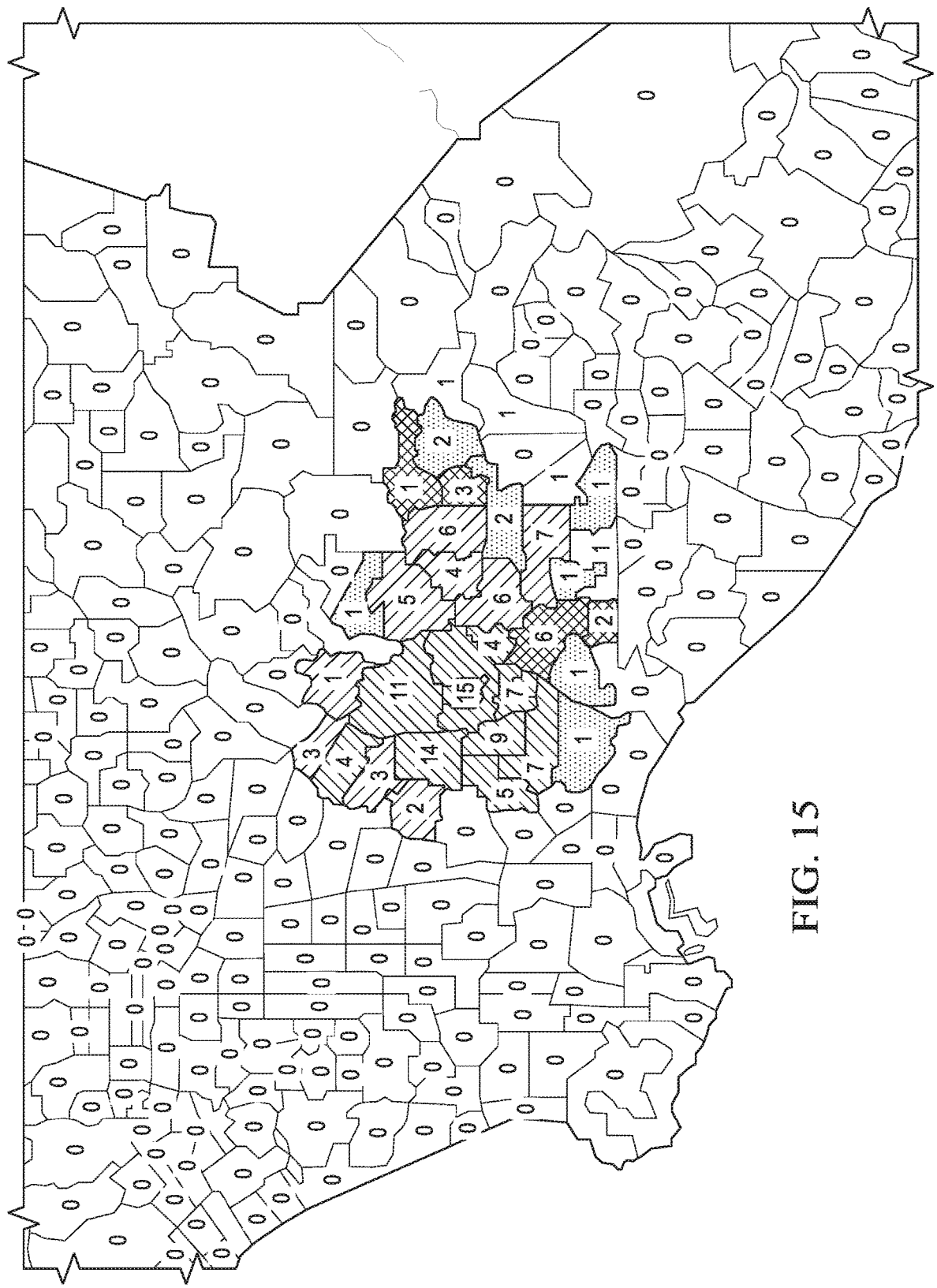

FIG. 15 provides another example of an interface which provides visualizations of a vehicle data system's application of a ZEUS model to a dealer network to determine a change for a dealer network based on the addition of a dealer. In this example, the predicted "lift" sales by ZIP following addition of a dealership is shown numerically with respect to the various zip codes displayed to the user.

Figure 16:
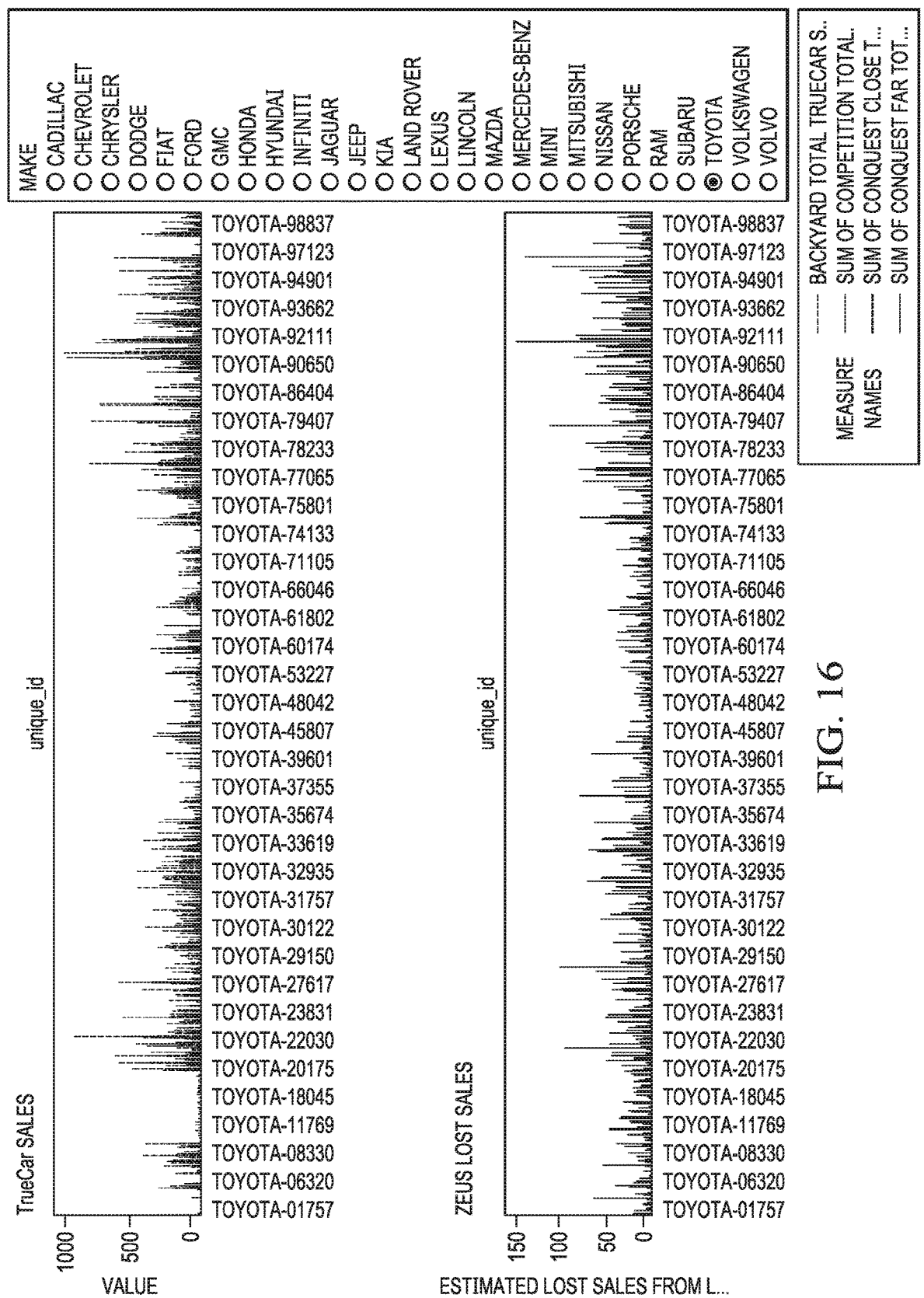

Multiple dealers may also be presented in a single interface, such as an interface that indicates for multiple dealers presented in association with one another indicating for each dealer how many lost sales are predicted should any dealer leave a dealer network. One embodiment of such an interface is presented in FIG. 16, where predicted lost sales may be denoted by the bars depicted in the "ZEUS Lost Sales" portion of the interface.

Figure 17:
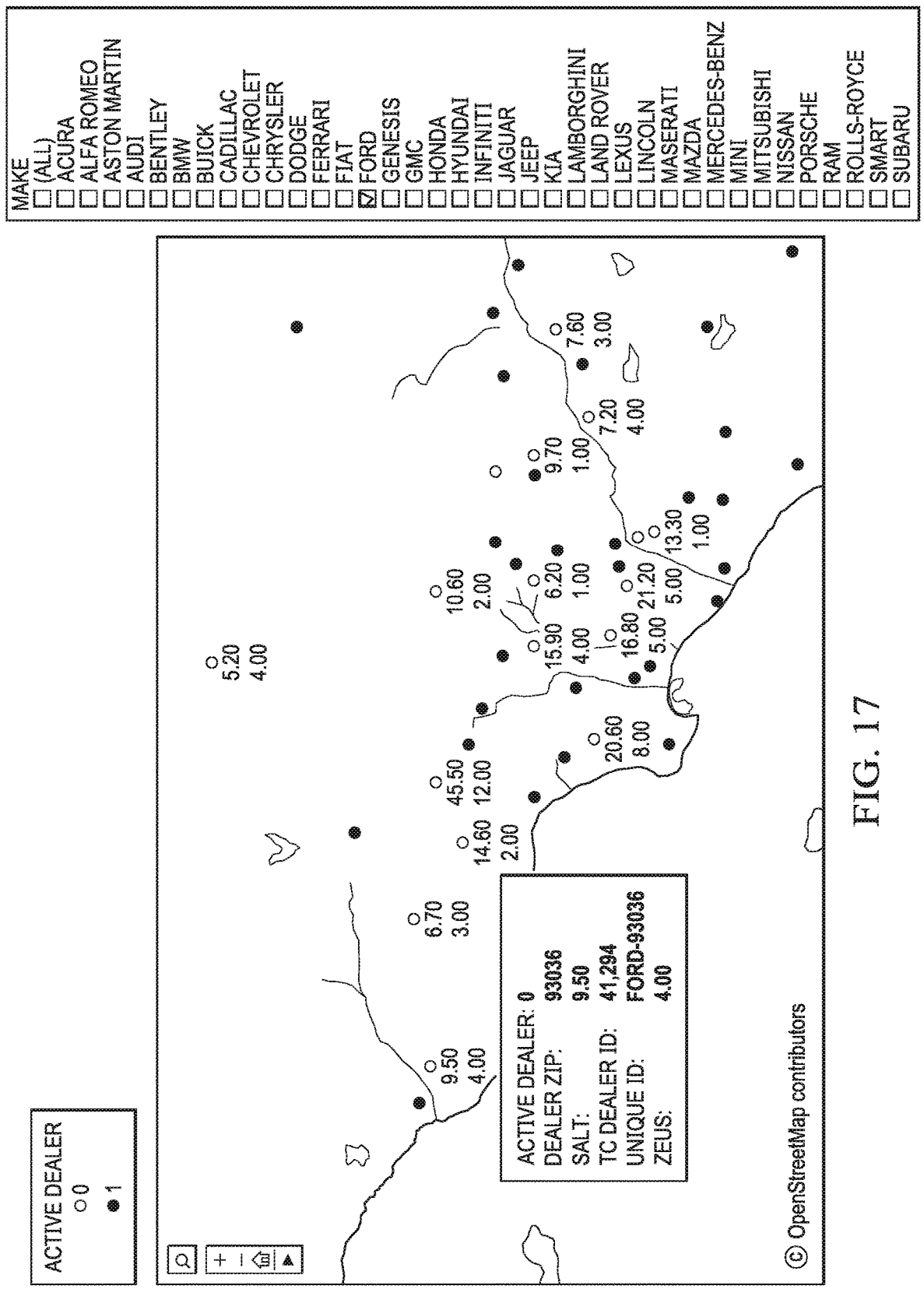
FIG. 17 is a depiction of an embodiment of an interface used by a vehicle data system for presenting the results of the application of a ZEUS model and a SALT model for a dealer or network of dealers.

It will also be apparent that embodiments of such an interface may present determinations made by application of a SALT model and a ZEUS model in the same interface. FIG. 17 depicts one embodiment of such an interface where the number of total sales and incremental sales predicted by the vehicle data system by applying the SALT model and the ZEUS model to a set of non-network dealers (represented by shaded dots) is shown for the set of non-network dealers. Additionally, this interface may also present dealers within the network (unshaded dots) as reference points for a user viewing the interface.

Embodiments of a hardware architecture for implementing certain embodiments are described herein. One embodiment can include one or more computers communicatively coupled to a network. As is known to those skilled in the art, the computer can include a central processing unit ("CPU"), at least one read-only memory ("ROM"), at least one random access memory ("RAM"), at least one hard drive ("HD"), and one or more input/output ("I/O") device(s). The I/O devices can include a keyboard, monitor, printer, electronic pointing device (such as a mouse, trackball, stylus, etc.), or the like. In various embodiments, the computer has access to at least one database over the network.

ROM, RAM, and HD are computer memories for storing computer instructions executable (which can be directly executed or made executable by, for example, compilation, translation, etc.) by the CPU. Within this disclosure, the term "computer-readable medium" is not limited to ROM, RAM, and HD and can include any type of data storage medium that can be read by a processor. In some embodiments, a computer-readable medium may refer to a data cartridge, a data backup magnetic tape, a floppy diskette, a flash memory drive, an optical data storage drive, a CD-ROM, ROM, RAM, HD, or the like.

At least portions of the functionalities or processes described herein can be implemented in suitable computer-executable instructions. The computer-executable instructions may be stored as software code components or modules on one or more computer readable media (such as non-volatile memories, volatile memories, DASD arrays, magnetic tapes, floppy diskettes, hard drives, optical storage devices, etc. or any other appropriate computer-readable medium or storage device). In one embodiment, the computer-executable instructions may include lines of compiled C++, Java, HTML, or any other programming or scripting code.

Additionally, the functions of the disclosed embodiments may be implemented on one computer or shared/distributed among two or more computers in or across a network. Communications between computers implementing embodiments can be accomplished using any electronic, optical, radio frequency signals, or other suitable methods and tools of communication in compliance with known network protocols.

As used herein, the terms "comprises," "comprising," "includes," "including," "has," "having" or any other variation thereof, are intended to cover a non-exclusive inclusion. For example, a process, product, article, or apparatus that comprises a list of elements is not necessarily limited only to those elements but may include other elements not expressly listed or inherent to such process, product, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

Additionally, any examples or illustrations given herein are not to be regarded in any way as restrictions on, limits to, or express definitions of, any term or terms with which they are utilized. Instead, these examples or illustrations are to be regarded as being described with respect to one particular embodiment and as illustrative only. Those of ordinary skill in the art will appreciate that any term or terms with which these examples or illustrations are utilized will encompass other embodiments which may or may not be given therewith or elsewhere in the specification and all such embodiments are intended to be included within the scope of that term or terms. Language designating such nonlimiting examples and illustrations includes, but is not limited to: "for example," "for instance," "e.g.," "in one embodiment."

Benefits, other advantages, and solutions to problems have been described above with regard to specific embodiments. However, the benefits, advantages, solutions to problems, and any component(s) that may cause any benefit, advantage, or solution to occur or become more pronounced are not to be construed as a critical, required, or essential feature or component.

What is claimed is:

1. A vehicle data system for determining and utilizing spatial or geography based metrics in a distributed computing environment based on enhanced data obtained from distributed sources, comprising:
    a plurality of computing devices coupled to one another, one or more user computer devices, and a plurality of distributed data sources over a network, wherein:
        a first computer device of the vehicle data system performs a process including:
            obtaining a set of historical transaction data associated with a vehicle make from a first distributed data source, where the set of historical transaction data comprises data on transactions associated with vehicles of the vehicle make;
            applying one or more transformations to the set of historical transaction data to create a modified set of historical transaction data that includes additional vehicle data collected from a second distributed data sources by VIN by correlating the additional vehicle data collected from the second distributed data sources with data on transactions of the set of historical transaction data;
            determining a competition zone index for a first dealer, a geographic area and a make of vehicle, the competition zone index quantifying the competitiveness of the first dealer in the geographic area, wherein determining a competition zone index comprises determining a distance between the geographic area and the first dealer, a distance between the geographic area and a closest second dealer, and a typical distance traveled from the zip code to purchase a vehicle of the vehicle make;
            creating a first training set of historical transaction data, the first training set comprising historical transaction data and modified historical transaction data;
            training a universal sales model at a first time using the first training set based on the competition zone;
            creating a second training set of historical transaction data, the second training set comprising modified historical transaction datal;
            training the universal sales model at a second time using the second training set based on the competition zone;
            receiving a request, the request associated with the first dealer and specifying the make;
            identifying a set of geographic areas within a distance of the first dealer;
            determining a predicted number of sales for the first dealer in a geographic area of the set of geographic areas based on the competition zone index for the first dealer and the universal sales model;
            generating an interface providing a visual representation of the geographic area and the predicted number of sales of the geographic area associated with the first dealer and the vehicle make; and
            responding to the request by distributing the generated interface over the network.

2. The system of claim 1, wherein a zone label is assigned to the geographic area for the first dealer.

3. The system of claim 1, wherein the set of historical transaction data is determined based on the first dealer.

4. The system of claim 1, wherein the competition zone index is a dealer competition zone index or a Customer Competition Zone (CCZ) index.

5. The system of claim 1, wherein the predicted number of sales is based on a dealer network associated with the first dealer.

6. The system of claim 5, wherein the predicted number of sales is based on a removal of the first dealer from the dealer network or an addition of the first dealer to the dealer network.

7. A method, comprising:
obtaining a set of historical transaction data associated with a vehicle make from a first distributed data source, where the set of historical transaction data comprises data on transactions associated with vehicles of the vehicle make;
applying one or more transformations to the set of historical transaction data to create a modified set of historical transaction data that includes additional vehicle data collected from a second distributed data sources by VIN by correlating the additional vehicle data collected from the second distributed data sources with data on transactions of the set of historical transaction data;
determining a competition zone index for a first dealer, a geographic area and a make of vehicle, the competition zone index quantifying the competitiveness of the first dealer in the geographic area, wherein determining a competition zone index comprises determining a distance between the geographic area and the first dealer, a distance between the geographic area and a closest second dealer, and a typical distance traveled from the zip code to purchase a vehicle of the vehicle make;
creating a first training set of historical transaction data, the first training set comprising historical transaction data and modified historical transaction data;
training a universal sales model at a first time using the first training set based on the competition zone;
creating a second training set of historical transaction data, the second training set comprising modified historical transaction datal;
training the universal sales model at a second time using the second training set based on the competition zone;
receiving a request, the request associated with the first dealer and specifying the make;
identifying a set of geographic areas within a distance of the first dealer;
determining a predicted number of sales for the first dealer in a geographic area of the set of geographic areas based on the competition zone index for the first dealer and the universal sales model;
generating an interface providing a visual representation of the geographic area and the predicted number of sales of the geographic area associated with the first dealer and the vehicle make; and
responding to the request by distributing the generated interface over the network.

8. The method of claim 7, wherein a zone label is assigned to the geographic area for the first dealer.

9. The method of claim 7, wherein the set of historical transaction data is determined based on the first dealer.

10. The method of claim 7, wherein the competition zone index is a dealer competition zone index or a Customer Competition Zone (CCZ) index.

11. The method of claim 7, wherein the predicted number of sales is based on a dealer network associated with the first dealer.

12. The method of claim 11, wherein the predicted number of sales is based on a removal of the first dealer from the dealer network or an addition of the first dealer to the dealer network.

13. A non-transitory computer readable medium, comprising instructions for:
obtaining a set of historical transaction data associated with a vehicle make from a first distributed data source, where the set of historical transaction data comprises data on transactions associated with vehicles of the vehicle make;
applying one or more transformations to the set of historical transaction data to create a modified set of historical transaction data that includes additional vehicle data collected from a second distributed data sources by VIN by correlating the additional vehicle data collected from the second distributed data sources with data on transactions of the set of historical transaction data;
determining a competition zone index for a first dealer, a geographic area and a make of vehicle, the competition zone index quantifying the competitiveness of the first dealer in the geographic area, wherein determining a competition zone index comprises determining a distance between the geographic area and the first dealer, a distance between the geographic area and a closest second dealer, and a typical distance traveled from the zip code to purchase a vehicle of the vehicle make;
creating a first training set of historical transaction data, the first training set comprising historical transaction data and modified historical transaction data;
training a universal sales model at a first time using the first training set based on the competition zone;
creating a second training set of historical transaction data, the second training set comprising modified historical transaction datal;
training the universal sales model at a second time using the second training set based on the competition zone;
receiving a request, the request associated with the first dealer and specifying the make;
identifying a set of geographic areas within a distance of the first dealer;
determining a predicted number of sales for the first dealer in a geographic area of the set of geographic areas based on the competition zone index for the first dealer and the universal sales model;
generating an interface providing a visual representation of the geographic area and the predicted number of sales of the geographic area associated with the first dealer and the vehicle make; and
responding to the request by distributing the generated interface over the network.

14. The non-transitory computer readable medium of claim 13, wherein a zone label is assigned to the geographic area for the first dealer.

15. The non-transitory computer readable medium of claim 13, wherein the set of historical transaction data is determined based on the first dealer.

16. The non-transitory computer readable medium of claim 13, wherein the competition zone index is a dealer competition zone index or a Customer Competition Zone (CCZ) index.

17. The non-transitory computer readable medium of claim 13, wherein the predicted number of sales is based on a dealer network associated with the first dealer.

18. The non-transitory computer readable medium of claim 17, wherein the predicted number of sales is based on a removal of the first dealer from the dealer network or an addition of the first dealer to the dealer network.

\* \* \* \* \*